United States Patent
Miyake et al.

(10) Patent No.: US 7,715,286 B2
(45) Date of Patent: May 11, 2010

(54) OPTICAL PICKUP SPHERICAL ABERRATION COMPENSATING METHOD, OPTICAL PICKUP SPHERICAL ABERRATION FOCUS OFFSET COMPENSATING METHOD, AND OPTICAL PICKUP DEVICE

(75) Inventors: Takahiro Miyake, Soraku-gun (JP); Makoto Horiyama, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1182 days.

(21) Appl. No.: 10/517,245

(22) PCT Filed: Jun. 20, 2003

(86) PCT No.: PCT/JP03/07864

§ 371 (c)(1), (2), (4) Date: Dec. 7, 2004

(87) PCT Pub. No.: WO04/001731

PCT Pub. Date: Dec. 31, 2003

(65) Prior Publication Data

US 2006/0062098 A1 Mar. 23, 2006

(30) Foreign Application Priority Data

Jun. 21, 2002 (JP) ............................. 2002-182029
Oct. 25, 2002 (JP) ............................. 2002-310666
Jan. 17, 2003 (JP) ............................. 2003-010093

(51) Int. Cl.
G11B 7/00 (2006.01)
(52) U.S. Cl. ............. 369/44.23; 369/44.32; 369/112.02

(58) Field of Classification Search ....................... None
See application file for complete search history.

(56) References Cited

U.S. PATENT DOCUMENTS 6,826,133 B2 * 11/2004 Ichimura et al. ........ 369/112.01

FOREIGN PATENT DOCUMENTS

| JP | 64-027030 | | 1/1989 |
|----|-----------|---|--------|
| JP | 08115521 A | * | 5/1996 |
| JP | 2000-011388 | | 1/2000 |
| JP | 2000-11388 | | 1/2000 |
| JP | 2000-40237 | | 2/2000 |

(Continued)

*Primary Examiner*—Jorge L Ortiz Criado
(74) *Attorney, Agent, or Firm*—Edwards Angell Palmer & Dodge LLP; David G. Conlin; David A. Tucker

(57) ABSTRACT

An optical pickup (20) projects a read beam onto an optical disc (40) as an optical storage medium which is driven to rotate by a spindle motor (30) and receives its reflection. A laser beam from a laser producing element (21) passes through a liquid crystal panel (25) and guided to an objective lens (26). The panel (25) is provided to correct spherical aberration caused by an irregular thickness of a transparent substrate of the optical disc (40). A control circuit (50) changes a spherical aberration correction signal SA to carry out sampling more than once, covering a range of the output of an optical sensor (31) where the output shows large changes. The circuit (50) determines the position of a peak of an approximation curve through calculation and designates that position as the magnitude of correction. Thus, the optical pickup (20) can quickly and accurately detect the magnitude of the correction of the spherical aberration caused by an irregular thickness of the optical disc (40).

15 Claims, 18 Drawing Sheets

FOREIGN PATENT DOCUMENTS

| | | |
|---|---|---|
| JP | 2000285485 A * | 10/2000 |
| JP | 2001-222838 | 8/2001 |
| JP | 2001-266392 | 9/2001 |
| JP | 2002-342952 | 11/2002 |
| JP | 2003-123282 | 4/2003 |
| JP | 2003-196856 | 7/2003 |
| JP | 2003-233917 | 8/2003 |
| WO | WO 03/015084 A1 | 2/2003 |

* cited by examiner

OPTICAL PICKUP SPHERICAL ABERRATION COMPENSATING METHOD, OPTICAL PICKUP SPHERICAL ABERRATION FOCUS OFFSET COMPENSATING METHOD, AND OPTICAL PICKUP DEVICE

TECHNICAL FIELD

The present invention relates to a spherical aberration correction method for optical pickups which are used in reading/writing compact discs (CD), laser discs (LD), digital versatile discs (DVD), and other like optical storage media, and relates also to a spherical aberration focus offset correction method for those optical pickups and the optical pickups.

BACKGROUND ART

Read/write optical pickups have been used in optical readers for read-only CDs, LDs, DVDs and other similar optical discs and also in optical reader/writer for write once or rewriteable optical discs, such as CD-Rs, CD-RWs, DVD-Rs, DVD-RWs, DVD-RAMs, and mini discs (MDs).

Optical discs as optical storage media have a transparent substrate with a predetermined thickness to cover their recording surface for protective purposes. An optical pickup as information readout means reads the optical disc by the intensity of reflection when a read beam is shone on the recording surface through the transparent substrate.

However, it is difficult in manufacturing to fabricate the transparent substrates in all optical discs with the same specified thickness; irregularities of a few or 10 to 40 micrometers are typical. The irregular thickness of the transparent substrate results in spherical aberration which in turn can markedly reduce the amplitude of an information readout signal and/or tracking error signal. This entails inaccurate information readout. Specifically, when changing optical discs, there will likely be a difference in thickness between the transparent substrates. The difference translates into a change in spherical aberration and without taking any measures, causes a fall in information readout accuracy.

The problem is addressed in Japanese published patent application 2001-222838 (Tokukai 2001-222838; published on Aug. 17, 2001). Tokukai 2001-222838 discloses a method involving spherical aberration correction means which corrects spherical aberration in an optical system in accordance with the magnitude of the spherical aberration, whereby the spherical aberration is corrected by observing the amplitude of a tracking error signal while varying the magnitude of correction so that the spherical aberration correction means is supplied with an final spherical correction assisting quantity which is the magnitude of correction at which the amplitude assumes a maximum value.

The spherical aberration correction means, according to Tokukai 2001-222838, is a liquid crystal panel in which a circular band of transparent electrode is formed on a liquid crystal layer filled with birefringent liquid crystal. The magnitude of correction is varied in accordance with the voltage applied to the transparent electrode. The liquid crystal panel as the spherical aberration correction means is located on the optical axis of a laser producing element. The laser beam radiating from the laser producing element thus develops a phase difference at its wavefront, passes through it, and converges on the recording surface of an optical disc.

Japanese published patent application 2000-11388 (Tokukai 2000-11388; published on Jan. 14, 2000) discloses a method of correcting spherical aberration in an optical system in accordance with the magnitude of the spherical aberration, using prerecorded prepit data on an optical disc as a reference signal. The spherical aberration is corrected by observing the amplitude of the reference signal while varying the magnitude of correction so as to produce an final spherical correction assisting quantity which will be the magnitude of correction at which the amplitude assumes a maximum value.

Tokukai 2000-11388, a conventional art, has a problem that it is not applicable to discs without prepit signals. In addition, the prepit signal is stored, for example, in sector marks which in general give such a small amount of data that the areas may not be sufficient to enable accurate observation of the magnitude of the correction of the spherical aberration. Moreover, in cases of write once, rewriteable, and other writeable optical discs, if the data derived from the prepit signal is applied to correction for storage areas, accurate correction is likely to be impossible because of, strictly speaking, different storage mechanisms: In prepit areas, recording utilizes the intensity of reflection which decreases when light diffracts in pit sections. In storage areas, recording utilizes the presence/absence of an increase in absorption by storage sections (tint signal).

Japanese published patent application 64-27030/1989 (Tokukaisho 64-27030; published on Jan. 30, 1989) provides exemplary write power and focus offset correction for writeable optical discs. According to Tokukaisho 64-27030, focus offset of an optical disc is corrected using an information readout signal as a reference signal. Write power is varied from one sector to another. After writing, the sectors are simultaneously read to find the sector with an optimal result. The write power for that sector is the optimal write power.

A disadvantage of the Tokukai 2001-222838 method above is an extended time the method needs to determine the magnitude of correction, because the spherical aberration correction means needs to examine the magnitude of correction throughout the available range to find a magnitude of correction at which the amplitude of the tracking error signal is at a maximum. Further, at lower spherical aberrations, the amplitude of the tracking error signal changes less, which makes it impossible to accurately find the maximum amplitude in the presence of noise, external disturbance, and other factors.

Tokukaisho 64-27030, a conventional art, has a problem of an extended time it takes to write multiple sectors using multiple write powers and read all the sectors to find an optimal magnitude of correction.

An alternative to the prepit signal as the reference signal is a track cross signal obtained when the optical pickup crosses a track. With this technique, however, the signal level can show a maximum value when the spherical aberration and the focus offset are not completely eliminated. If this happens, conversion to an optimal condition cannot be achieved.

This particular problem will be described in more detail in reference to FIG. 18 which is a graph showing measurements of the levels of a reference signal in relation to two kinds of parameters, i.e. the spherical aberration and the focus offset. The measurements were performed by the inventors of the instant invention. The optical disc used contained a 0.1 mm thick transparent, polycarbonate substrate and has a track pitch of 0.32 μm and a disc groove depth of 21 nm. The pickup used in the measurement had a laser wavelength of 405 nm. The objective lens had a NA of 0.85.

FIG. 18 is a 2-dimensional map of a total of 6×11=66 data points, showing maximum amplitude values of a track cross signal. Six spherical aberrations from −80 mλ to +80 mλ were plotted on the horizontal axis, and 11 focus offsets from −0.22 to +0.22 μm were plotted on the vertical axis. "mλ" is a general unit for aberration. "λ" is the wavelength of a laser where 1 mλ=0.001λ. For example, λ=405 nm for a typical blue laser.

As obviously seen from FIG. 18, the reference signal is at a maximum in the left-falling region immediately surrounding the original point where either the spherical aberration or the focus offset is not 0. This shows that the reference signal can be at a maximum even when the lens-to-lens distance is not optimal and the lenses are out of focus. The track cross signal therefore cannot be used for accurate measurement of spherical aberration and focus offset.

The present invention has an objective to provide a spherical aberration correction method for an optical pickup capable of quick correction of spherical aberration using an accurate optimal magnitude of aberration correction without being affected by noise, external disturbance, and other factors, and also to provide such an optical pickup.

The present invention has another objective to provide a spherical aberration focus offset correction method for an optical pickup capable of quick and accurate correction of spherical aberration and focus offset for a writeable optical disc, and also to provide an optical pickup with such correction functions.

DISCLOSURE OF INVENTION

An optical pickup of the present invention is an optical pickup projecting a collected beam onto a recording surface of an optical storage medium to retrieve recorded information by means of the intensity of reflection from the recording surface. The pickup corrects a first spherical aberration in an optical system by producing at correcting means a second spherical aberration which cancels the first spherical aberration. The pickup is characterized in that the correcting means is capable of producing at least two second spherical aberrations of different magnitudes by means of a collected beam spot on the recording surface of the optical storage medium so that the magnitudes are ¼ or more of the wavelength λ in P-V values or ¹⁄₁₄ or more of the wavelength λ in standard deviation. The pickup is characterized also in that the pickup includes control means which: causes the correcting means to produce the at least two second spherical aberrations of different magnitudes; calculates an optimal magnitude of aberration correction for the first spherical aberration through a numeric evaluation based on an evaluation value of a reference signal obtained by receiving the reflection of intensities in the presence of the spherical aberrations of such magnitudes; and controls the correcting means to carry out correction using the optimal magnitude of aberration correction.

A method of correcting a spherical aberration of an optical pickup of the present invention is a method of correcting a first spherical aberration in an optical system by producing a second spherical aberration which cancels the first spherical aberration when the pickup projects a collected beam onto a recording surface of an optical storage medium to retrieve recorded information by means of the intensity of reflection from the recording surface. The method is characterized in that it involves the steps of: producing at least two second spherical aberrations of different magnitudes by means of a collected beam spot on the recording surface of the optical storage medium so that the magnitudes are ¼ or more of the wavelength λ in P-V values or ¹⁄₁₄ or more of the wavelength λ in standard deviation; calculating an optimal magnitude of aberration correction for the first spherical aberration through a numeric evaluation based on an evaluation value of a reference signal obtained by receiving the reflection of intensities in the presence of the spherical aberrations of such magnitudes; and correcting the first spherical aberration using the optimal magnitude of aberration correction.

According to the present invention, the second spherical aberrations produced by the correcting means are ¼ or more of the wavelength λ in P-V values or ¹⁄₁₄ or more of the wavelength λ in standard deviation. A reference signal is produced by correcting using these second spherical aberrations and receiving the reflection of intensities from the recording surface of the optical storage medium. In terms of the nature of changes in the evaluation value of the reference signal, a part of that signal can be utilized where the changes in the evaluation value show high sensitivity to changes in the magnitude of correction.

The optimal magnitude of aberration correction is calculated not based on the detection of a peak or bottom value, but through a numeric evaluation. A numeric evaluation using the second spherical aberrations and the associated levels of the reference signal, not affected by noise, external disturbances, or other unwanted factors, will produce a single optimal magnitude of aberration correction. The detected optimal magnitude of aberration correction is thus accurate.

In addition, at least two points of measurement are needed where a spherical aberration of the second magnitude is produced and a numeric evaluation is performed based on a reference signal. Unlike conventional cases, there is no need to measure across the entire range of the variable magnitude of spherical aberration. This allows for an attempt to reduce the time it takes to perform measurement related to spherical aberration correction.

In the present invention, in the numeric evaluation, the control means may calculate an approximation curve from the at least two second spherical aberrations of different magnitudes produced by the correcting means and the evaluation value for these second spherical aberrations and designate a peak or bottom position of the approximation curve as the optimal magnitude of aberration correction.

According to the present invention, the evaluation value of an actual reference signal may not have a clear peak or bottom against changes in magnitude of the spherical aberration correction. In these cases, an approximation curve can still be calculated to determine a single virtual peak or bottom. Thus, a single optimal magnitude of aberration correction can be determined.

In the present invention, the approximation curve may be a multiple term approximation curve.

According to the present invention, the approximation curve is a multiple term approximation curve. The calculation formulae is relatively easy. The invention can therefore be implemented on calculation circuitry of a relatively small scale or calculation software of a relatively small volume.

In the present invention, the control means may be arranged to: cause the correcting means to produce the two second spherical aberrations of different magnitudes so that the two second spherical aberrations are separated by ½ or more of the wavelength λ in P-V values and that the second spherical aberrations have substantially equal evaluation values; calculate a mean value of the two magnitudes of the spherical aberrations as the numeric evaluation; and use the mean value obtained in the mean value calculation as the optimal magnitude of aberration correction.

According to the present invention, the correcting means produces the two second spherical aberrations of different magnitudes so that the reference signals obtainable in accordance with the magnitudes of spherical aberration have substantially equal evaluation values. The numeric evaluation produces a mean value of the two second spherical aberrations of different magnitudes. Since the optimal magnitude of aberration correction is the mean value of the two second spherical aberrations of different magnitudes, the optimal magnitude of aberration correction thus calculated is accurate.

In the present invention, the control means may be arranged to: cause the correcting means to produce a second spherical aberration of a first magnitude and a second spherical aberration of a second magnitude which is separated by ½ or more of the wavelength λ in P-V values from the second spherical aberration of the first magnitude so that the second spherical aberration of the second magnitude can produce a reference signal having an evaluation value substantially equal to that of a reference signal obtained in the production of the second spherical aberration of the first magnitude; calculate a mean value of the second spherical aberrations of the first and second magnitudes as the numeric evaluation; and use the mean value obtained in the mean value calculation as the optimal magnitude of aberration correction.

According to the present invention, the correcting means produces the second spherical aberration of the first magnitude and the second spherical aberration of the second magnitude which is separated by ½ or more of the wavelength λ in P-V values from the second spherical aberration of the first magnitude so that the second spherical aberration of the second magnitude can produce a reference signal having an evaluation value substantially equal to that of a reference signal obtained in the production of the second spherical aberration of the first magnitude. The numeric evaluation produces a mean value of the two second spherical aberrations. The use of the mean value obtained in the mean value calculation renders the calculation of the optimal magnitude of aberration correction more accurate.

Note that if the optical pickup is characterized in that the reference signal is an information signal read from the recording surface of the optical storage medium and also that an evaluation value of the reference signal is an amplitude level, the spherical aberration correction is carried out with increased accuracy, because the information signal of which the quality must be ensured by the optical pickup is designated as the direct reference signal.

If the optical pickup is characterized in that the reference signal is a tracking error signal and also that an evaluation value of the reference signal is an amplitude level, the pickup becomes more immune to noise, external disturbance, and other unwanted factors, because the reference signal is a tracking error signal where the signal amplitude is large and sensitive.

If the optical pickup is characterized in that the reference signal is an information signal and also that an evaluation value of the reference signal is jitter, the spherical aberration correction is carried out with increased accuracy, because the evaluation value is jitter which is highly related to information signal quality.

If the optical pickup is characterized in that the reference signal is an information signal and also that an evaluation value of the reference signal is an error rate, the spherical aberration correction is carried out with increased accuracy, because the evaluation value is an error rate which is highly related to information signal quality.

In the present invention, the correcting means may be arranged to include: a liquid crystal panel containing a circular band of transparent electrode provided on a liquid crystal layer filled with birefringent liquid crystal; and a liquid crystal drive circuit applying to the transparent electrode voltages corresponding to the at least two second spherical aberrations of different magnitudes.

According to the present invention, the liquid crystal layer is placed under an electric field, and a desired magnitude of spherical aberration can be immediately produced with no mechanical motion based on the birefringent nature of the liquid crystal. Therefore, the magnitude of spherical aberration can be accurately managed.

In the present invention, the correcting means may be arranged to be a beam expander including a pair of lenses and capable of producing the second spherical aberrations by varying a distance between the lenses.

According to the present invention, the beam expander, or the correcting means, is relatively easy to build into the optical pickup and calibrate, because it is not much affected by the relative displacement from the beam-collecting objective lens.

In the present invention, the correcting means may be arranged to be positioned on an optical path along which the beam projected onto the recording surface of the optical storage medium and the reflection from the recording surface travel.

According to the present invention, the correction by the magnitude of spherical aberration produced by the correcting means is done on an optical path on which the beam projected onto the recording surface of the optical storage medium travels and so does the reflection from the recording surface. Therefore, the correction is doublefold on the projected light and the reflected light. Each magnitude of spherical aberration result in double correction, equivalent to two times the magnitude of spherical aberration.

In the present invention, the optical pickup may be arranged so that: the control means causes the correcting means to produce a second spherical aberration of a first magnitude and a second spherical aberration of a second magnitude so that the second spherical aberration of the second magnitude can produce a reference signal having an evaluation value substantially equal to that of a reference signal obtained in the production of the second spherical aberration of the first magnitude, calculates a mean value of the second spherical aberrations of the first and second magnitudes as the numeric evaluation, and uses the mean value obtained in the mean value calculation as the optimal magnitude of aberration correction; and the first and second magnitudes are smaller than a maximum signal amplitude by 5% or more.

According to the present invention, the second spherical aberrations of the first and second magnitudes are produced so that they are 5% or more smaller than a maximum signal amplitude which is a peak amplitude. The evaluation values of the reference signals are rendered substantially equal. The optimal magnitude of aberration correction is calculated through the calculation of a mean value. Therefore, the correction is accurate.

In the present invention, the optical pickup may be arranged so that: prior to adjustment of a focus offset, the control means: causes the correcting means to produce a second spherical aberration of a first magnitude and a second spherical aberration of a second magnitude so that the second spherical aberration of the second magnitude can produce a reference signal having an evaluation value substantially equal to that of a reference signal obtained in the production of the second spherical aberration of the first magnitude; calculates a mean value of the second spherical aberrations of the first and second magnitudes as the numeric evaluation; and uses the mean value obtained in the mean value calculation as the optimal magnitude of aberration correction; and the first and second magnitudes are smaller than a maximum signal amplitude by 10% or more.

According to the present invention, the second spherical aberrations of the first and second magnitudes are produced so that they are 10% or more smaller than a maximum signal amplitude which is a peak amplitude. The evaluation values of the reference signals are rendered substantially equal. The optimal magnitude of aberration correction is calculated through the calculation of a mean value. Therefore, the optimal magnitude of aberration correction can be calculated with improved accuracy, and the resultant correction is accurate.

A method of correcting a spherical aberration focus offset of an optical pickup of the present invention corrects a spherical aberration and a focus offset in an optical system when the pickup projects a collected beam onto a recording surface of an optical storage medium to retrieve recorded information by means of the intensity of reflection from the recording surface. The method is characterized in that it involves: the step of recording a signal on the storage medium at a predetermined write power; the step of reproducing the recorded information from the reflection; the step of producing a first correction target in the presence of a predetermined second correction target and changing the first correction target, where the first correction target is either one of the focus offset and the spherical aberration, and the second correction target is the other one; the optimal first correction target detection step of detecting an occurrence condition of the first correction target when the first correction target is a minimum; the step of producing the second correction target under an occurrence condition of the minimum first correction target and changing the magnitude of the second correction target; and the optimal second correction target detection step of detecting an occurrence condition of the second correction target when the second correction target is a minimum, wherein the magnitude of the spherical aberration and the magnitude of the focus offset obtained in the first correction target detection step and the optimal second correction target detection step are used to correct the spherical aberration and the focus offset.

Another method of correcting a spherical aberration focus offset of an optical pickup of the present invention corrects a spherical aberration and a focus offset in an optical system when the pickup projects a collected beam onto a recording surface of an optical storage medium to retrieve recorded information by means of the intensity of reflection from the recording surface. The method is characterized in that it involves: the step of recording a signal on the storage medium at a predetermined write power; the step of reproducing the recorded information from the reflection; the step of producing a spherical aberration in the presence of a predetermined focus offset and changing the magnitude of the spherical aberration; the optimal spherical aberration detection step of detecting a spherical aberration occurrence condition when the spherical aberration is a minimum; the step of producing a focus offset under the minimum spherical aberration occurrence condition and changing the magnitude of the focus offset; and the optimal focus offset detection step of detecting a focus offset occurrence condition when the focus offset is a minimum, wherein the magnitude of the spherical aberration and the magnitude of the focus offset obtained in the optimal spherical aberration detection step and the optimal focus offset detection step are used to correct the spherical aberration and the focus offset.

Another method of correcting a spherical aberration focus offset of an optical pickup of the present invention corrects a spherical aberration and a focus offset in an optical system when the pickup projects a collected beam onto a recording surface of an optical storage medium to retrieve recorded information by means of the intensity of reflection from the recording surface. The method is characterized in that it involves: the step of recording a signal on the storage medium at a predetermined write power; the step of reproducing the recorded information from the reflection; the step of producing a focus offset in the presence of a predetermined spherical aberration and changing the magnitude of the focus offset; the optimal focus offset detection step of detecting a focus offset occurrence condition when the focus offset is a minimum; the step of producing a spherical aberration under the minimum focus offset occurrence condition and changing the magnitude of the spherical aberration; and the optimal spherical aberration detection step of detecting a spherical aberration occurrence condition when the spherical aberration is a minimum, wherein the magnitude of the spherical aberration and the magnitude of the focus offset obtained in the optimal focus offset detection step and the optimal spherical aberration detection step are used to correct the spherical aberration and the focus offset.

According to the arrangement, in correcting the spherical aberration and the focus offset of the optical pickup, the inventors varied two parameters, the spherical aberration and the focus offset, independently and paid attention to a finding that the optimal value of either one of the parameters could be obtained without being affected, when the other parameter was not optimal.

Accordingly, in read operation, the spherical aberration is first varied to detect an optimal magnitude of spherical aberration. Subsequently, using that optimal magnitude of spherical aberration, the focus offset is varied to detect an optimal magnitude of focus offset. Alternatively, in read operation, the focus offset is first varied to detect an optimal magnitude of focus offset. Subsequently, using that optimal magnitude of spherical aberration, the spherical aberration is varied to detect an optimal magnitude of spherical aberration.

Thus, the spherical aberration and focus offset of a writeable optical disc can be corrected quickly and accurately.

The method of correcting a spherical aberration focus offset of an optical pickup of the present invention is characterized in that a spherical aberration and/or a focus offset are produced which maximize an amplitude of the reproduced signal.

According to the arrangement, since a reproduction signal of the recorded information of which the quality must be ensured by the optical pickup is directly designated as a reference signal, the resultant correction is accurate, needs no complex signal processing, and is implemented on a simple circuit.

The method of correcting a spherical aberration focus offset of an optical pickup of the present invention is characterized in that a spherical aberration and/or a focus offset are produced which minimize a jitter of the reproduced signal.

According to the arrangement, since jitter, which is highly related to recorded information quality which must be ensured by the optical pickup, is designated as a reference signal, the signal processing is relatively simple and the resultant correction is highly accurate.

The method of correcting a spherical aberration focus offset of an optical pickup of the present invention is characterized in that a spherical aberration and/or a focus offset are produced which minimize an error rate of the reproduced signal.

According to the arrangement, since an error rate, which is highly related to recorded information quality which must be ensured by the optical pickup, is designated as a reference signal, the resultant correction boasts the highest levels of accuracy and sensitivity.

An optical pickup of the present invention includes a correction device producing a spherical aberration and a focus offset which cancel a spherical aberration and a focus offset in an optical system for correction when the pickup projects a collected beam onto a recording surface of an optical storage medium to retrieve recorded information by means of the intensity of reflection from the recording surface. The pickup is characterized in that the correction device includes: recording condition detecting means detecting a recording condition recorded in advance on the optical storage medium; test write means test-writing a predetermined signal in a test write area of the optical storage medium under the recording condition detected by the recording condition detecting means; and correcting means executing: the process of producing a first correction target in the presence of a predetermined second correction target and changing the first correction target using a reproduction signal from the test write area, where the first correction target is either one of the focus offset and the spherical aberration, and the second correction target is the other one; the optimal first correction target detection process of detecting an occurrence condition of the first correction target when the first correction target is a minimum; the process of producing the second correction target under an occurrence condition of the minimum first correction target and changing the magnitude of the second correction target; the optimal second correction target detection process of detecting an occurrence condition of the second correction target when the second correction target is a minimum; and the process of using the magnitude of the spherical aberration and the magnitude of the focus offset obtained in the first correction target detection process and the optimal second correction target detection process to correct the spherical aberration and the focus offset.

According to the arrangement, to correct the spherical aberration and the focus offset, the recording condition detecting means first detects the recording conditions of the optical storage medium in, for example, lead-in information. According to the recording conditions, the test write means test-writes data in the test write area. Based on a reproduction signal from that test write area, the correcting means corrects the spherical aberration and the focus offset by the foregoing method.

Therefore, the resultant optical pickup is capable of quickly and accurately correcting spherical aberration and focus offset of a writeable optical disc.

The optical pickup of the present invention is characterized in that the correcting means is a beam expander including a pair of lenses and matches a distance between the lenses to the magnitude of the spherical aberration obtained in the optimal spherical aberration detection step.

According to the arrangement, accuracy requirements in assembly and calibration are relatively slack, allowing for easy assembly. In addition, there is no need to continuously apply a voltage throughout spherical aberration correcting operation, saving power consumption.

The optical pickup of the present invention is characterized in that the correcting means includes: a liquid crystal panel containing a circular band of transparent electrode provided on a liquid crystal layer filled with birefringent liquid crystal; and a liquid crystal drive circuit applying to the transparent electrode voltages corresponding to the magnitude of the spherical aberration obtained in the optimal spherical aberration detection step.

According to the arrangement, there are no movable sections. The pickup picks up no external disturbances.

Additional objects, advantages and novel features of the invention will be set forth in part in the description which follows, and in part will become apparent to those skilled in the art upon examination of the following or may be learned by practice of the invention.

BEST MODE FOR CARRYING OUT THE INVENTION

The following will describe embodiments of the present invention in detail in reference to figures. Members which are equivalent among the embodiments are designated the same reference numbers, and redundant description may be omitted.

Embodiment 1

Figure 1:
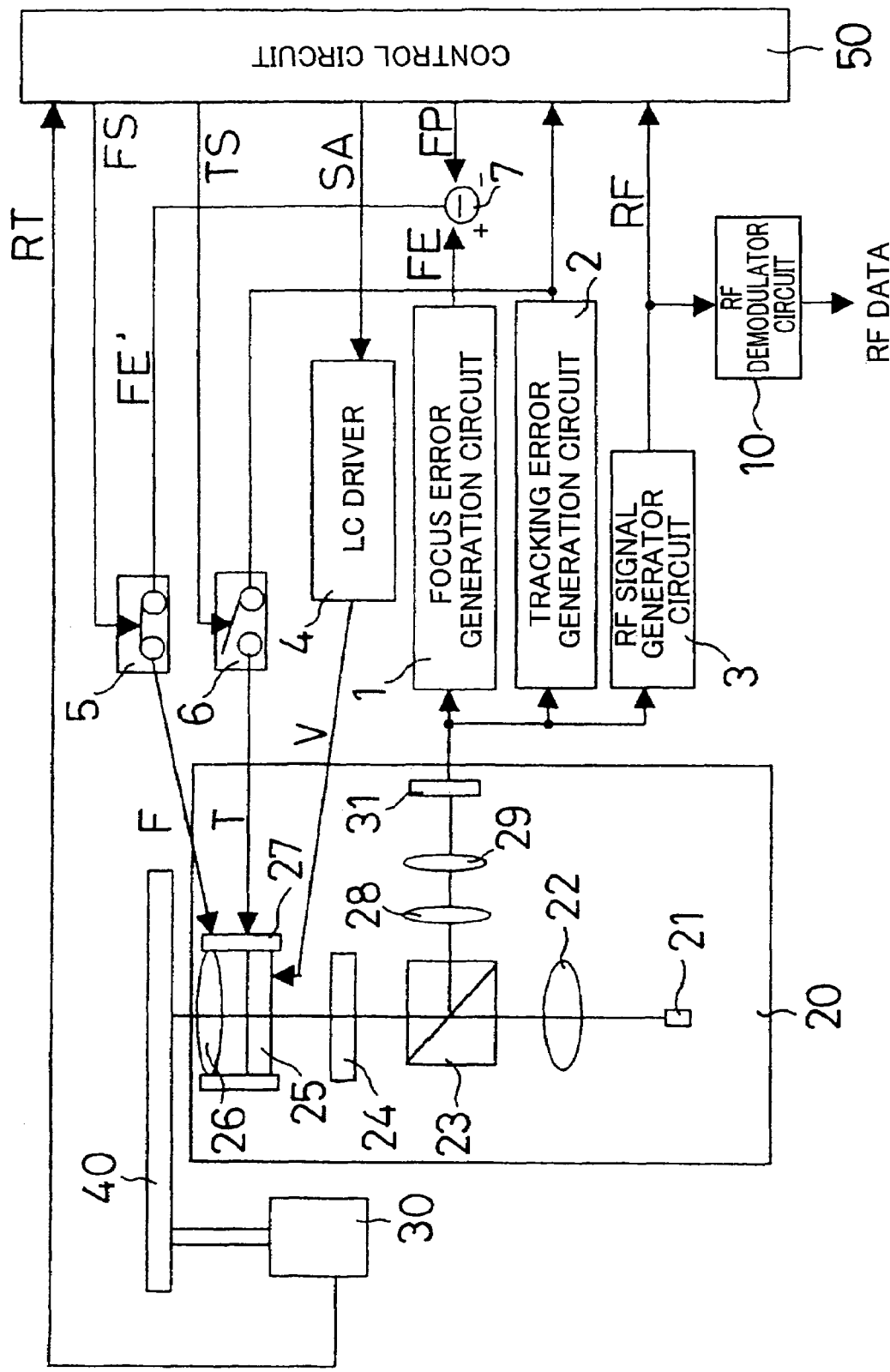
FIG. 1 is a schematic block diagram depicting the construction of an optical pickup which is an embodiment of the present invention.

FIG. 1 depicts the construction of an optical pickup which is the first embodiment of the present invention. In FIG. 1, a pickup 20 emits a read beam onto an optical disc 40 as an optical storage medium which rotates as driven by a spindle motor 30, and receives a reflection from the disc 40. In the driving, for every revolution of the optical disc 40, the spindle motor 30 generates a revolution signal RT for output to a control circuit 50. After shining a read beam onto the optical disc 40 and receiving its reflection, the pickup 20 converts that incoming light to an electric signal for output to a focus error generation circuit 1, a tracking error generation circuit 2, and a RF signal generator circuit 3.

The pickup 20 contains a laser producing element 21, a collimating lens 22, a beam splitter 23, a quarter-wave plate 24, a liquid crystal panel 25, an objective lens 26, a focusing tracking actuator 27, a collective lens 28, a cylindrical lens 29, and an optical sensor 31. The laser producing element 21 generates a laser beam at a predetermined light power. The laser beam passes through the liquid crystal panel 25 and delivered to the objective lens 26. The panel 25 corrects spherical aberration (first spherical aberration) that is caused by an irregular thickness of the transparent substrate of the optical disc 40. The liquid crystal panel 25, acting as correcting means, is driven in accordance with a spherical aberration correction signal SA fed from the control circuit 50 which acts as control means to the liquid crystal driver 4.

Figure 2:
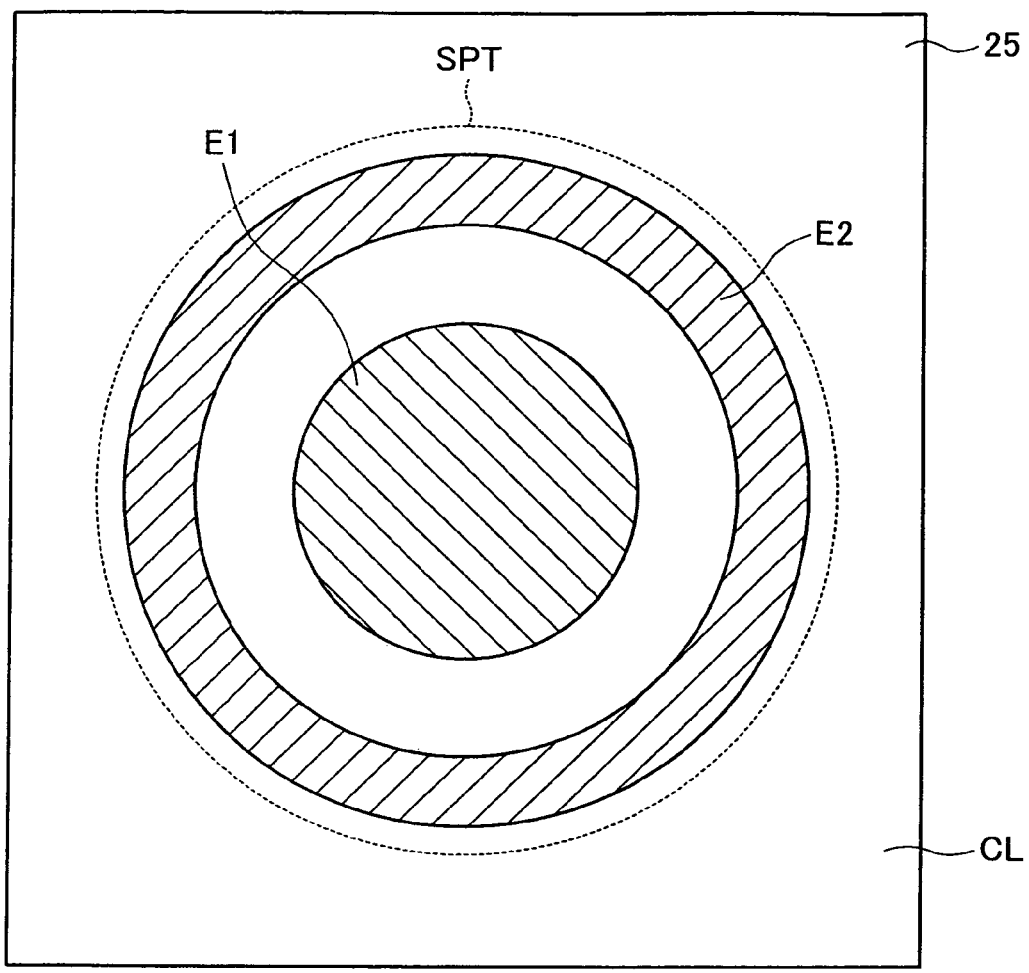
FIG. 2 is a plan view depicting the structure of a liquid crystal panel used as aberration correction means in the FIG. 1 embodiment.

FIG. 2 illustrates the structure of the liquid crystal panel 25 as seen from the optical axis of the laser beam. As in the figure, the liquid crystal panel 25 contains a circular, transparent electrode E1, a circular band of transparent electrode E2, and a liquid crystal layer CL filled with birefringent liquid crystal molecules. The transparent electrode E1 measures, for example, about 1600 µm in diameter when the objective lens 26 has a diameter of 3000 µm. The transparent electrode E2 has an outer diameter of about 2800 µm. The transparent electrodes E1 and E2 are positioned so that their center axes are both located on the optical axis of the laser beam. The transparent electrode E1 is supplied with a predetermined voltage fixed at, for example, 2 volts. The transparent electrode E2 is supplied with a liquid crystal drive voltage CV from the liquid crystal driver 4. Under these applied voltages, those liquid crystal molecules filling the liquid crystal layer CL which are beneath the circular band area covered with the transparent electrode E2 alter their twist angles in accordance with the liquid crystal drive voltage CV. In the beam spot SPT formed by the laser beam illuminating the liquid crystal panel 25, as shown in FIG. 2, a phase difference develops between the rays of light passing through the area covered with the transparent electrode E2 and the rays of light passing through the other areas in accordance with the liquid crystal drive voltage CV. That is, the liquid crystal panel 25, in the transmission process, imparts such a phase difference at the wavefront of the incoming laser beam emitted by the laser producing element 21 before the beam leaves the panel 25.

Owing to that action, the liquid crystal panel 25 corrects the spherical aberration (first spherical aberration) that is caused by an irregular thickness of the transparent substrate of the optical disc 40. In this manner, in the spherical aberration correction by means of the liquid crystal panel 25, a desired spherical aberration (second spherical aberration) which cancels the spherical aberration caused by the irregular thickness of the transparent substrate can be immediately generated with no mechanical motion; the magnitude of spherical aberration generated for correction can be managed accurately. The objective lens 26 collects the laser beam coming from the liquid crystal panel 25 onto a recording track on the recording surface of the optical disc 40 as the aforementioned read beam.

As to focusing, the focusing tracking actuator 27 moves the objective lens 26 in a direction normal to the recording surface of the optical disc 40, or so-called focusing trajectory, by an amount which is in accordance with a focus drive signal F fed via a servo loop switch 5.

As to tracking, the focusing tracking actuator 27 moves the optical axis of the objective lens 24 in the radial direction of the optical disc 40 by an amount which is in accordance with a tracking drive signal T fed via a servo loop switch 6.

Figure 3:
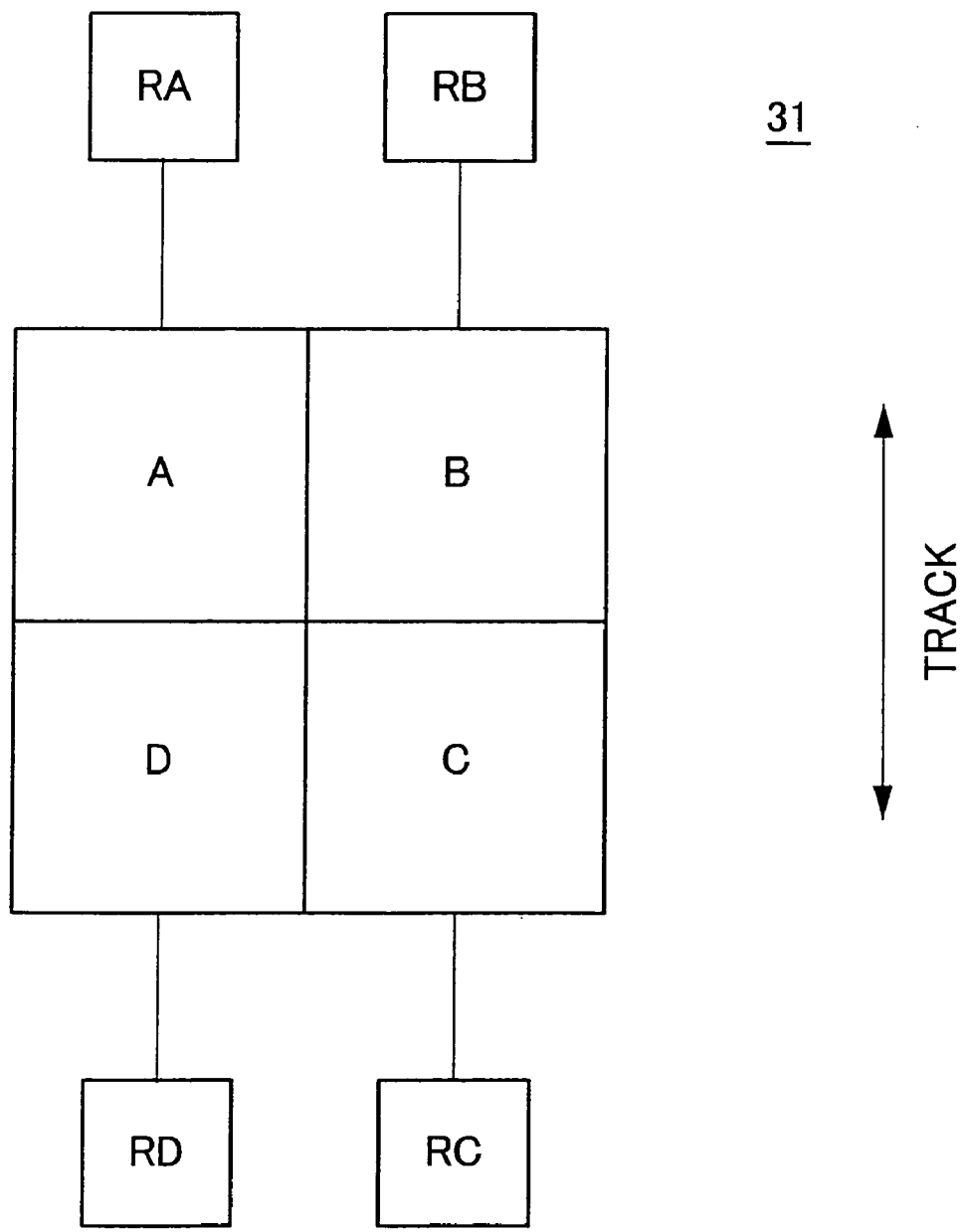
FIG. 3 is a drawing depicting the structure of a light receiving face of the optical sensor in FIG. 1.

FIG. 3 is a drawing showing the light receiving face of the optical sensor 31. The reflection of the read beam shone onto the recording track of the optical disc 40 passes through the objective lens 26, the liquid crystal panel 25, and the quarter-wave plate 24, before changing its traveling direction at the beam splitter 23. The light further passes through the collective lens 28 and the cylindrical lens 29, and hits the light receiving face of the optical sensor 31. The optical sensor 31 has four independent light receiving elements A to D which are arranged as shown in the figure with respect to the track direction. The light receiving elements A to D receive reflection from the optical disc 40 and convert it to respective electric signals, or photoelectric converted signals RA to RD, for output.

The focus error generation circuit 1 adds the outputs of the light receiving elements A to D which are located at diagonal positions across the optical sensor 31 to produce two sums. The circuit 1 then supplies the difference between the sums (focus error signal FE) to the subtracter 7. In other words, the focus error generation circuit 1 supplies a focus error signal FE=(RA+RC)−(RB+RD) to the subtracter 7. The subtracter 7 subtracts a position-on-focusing-trajectory signal FP from the focus error signal FE and feeds a resulting focus error signal FE' to the servo loop switch 5. The subtracter 7 is fed with the signal FP by the control circuit 50. The servo loop switch 5 turns on/off in accordance with a focus servo switching signal FS fed from the control circuit 50.

For example, the servo loop switch 5 turns off when the focus servo switching signal FS is a logic 0 indicating a focus servo turn-off. When the focus servo switching signal FS is a logic 1 indicating a focus servo turn-on, the switch 5 turns on and starts supplying a focus drive signal F to the focusing tracking actuator 27 in accordance with the focus error signal FE'. In other words, a system including the pickup 20, the focus error generation circuit 1, the subtracter 7, and the servo loop switch 5 constitutes a so-called focus servo loop. Owing to this focus servo loop, the objective lens 26 maintains its position on the focusing trajectory in accordance with the position-on-focusing-trajectory signal FP.

The tracking error generation circuit 2 adds the outputs of the light receiving elements A to D of the optical sensor 31 which are located adjacent to each other in the track direction to produce two sums. The circuit 2 then supplies the difference between the sums (tracking error signal) to the servo loop switch 6. In other words, the circuit 2 supplies a tracking error signal (RA+RD)−(RB+RC) to the switch 6. The servo loop switch 6 turns on/off in accordance with a tracking servo switching signal TS fed from the control circuit 50.

For example, when the tracking servo switching signal TS is a logic 1 indicating a tracking servo turn-on, the servo loop switch 6 turns on and starts supplying a tracking drive signal T to the focusing tracking actuator 27 in accordance with the tracking error signal. When the tracking servo switching signal TS is a logic 0 indicating a tracking servo turn-off, the switch 6 turns off, suspending the supplying of the tracking drive signal T to the focusing tracking actuator 27.

The RF signal generator circuit 3 adds the photoelectric converted signals RA to RD to produce a sum (information readout signal) representing information data on the optical disc 40. The circuit 3 then feeds the information readout signal to a RF demodulator circuit 10 and the control circuit 50. The RF demodulator circuit 10 performs predetermined demodulation on the information readout signal to recover the information data (RF data representing reproduced information) for output.

Figure 4:
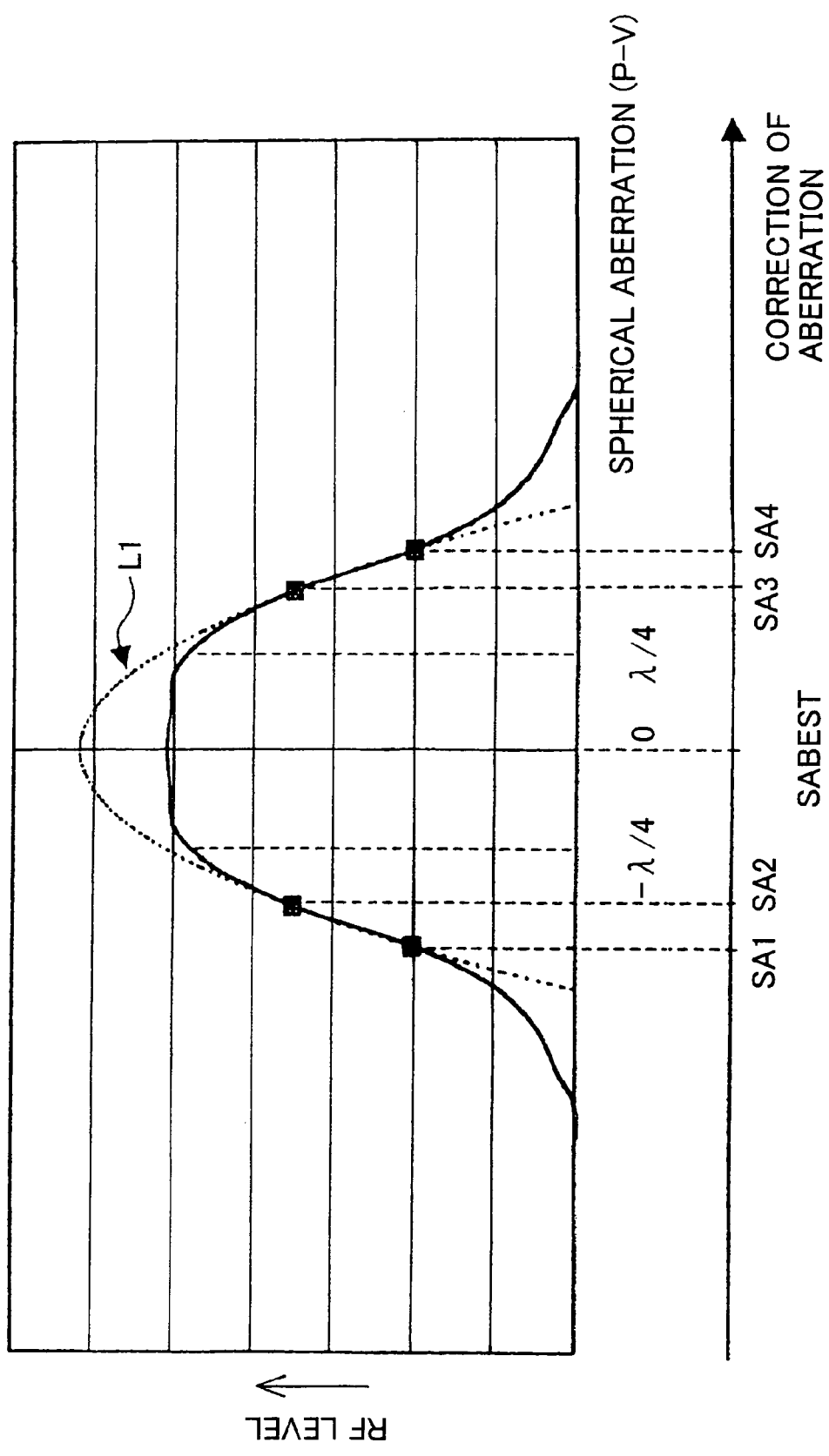
FIG. 4 is a graph depicting the relationship between spherical aberration and a RF level in the FIG. 1 embodiment.

FIG. 4 shows the RF level of the information readout signal changing with spherical aberration correction when the FIG. 1 optical pickup has spherical aberration left uncorrected. Plotting the P-V value of the spherical aberration of the device on the horizontal axis and the RF level of the information readout signal on the vertical axis, the RF level is a maximum when the spherical aberration is 0. The RF level however hardly changes where the spherical aberration is less than or equal to a reference value for optical characteristics evaluation relative to a 0 spherical aberration point. Well-known reference values for evaluation are the Rayleigh limit and Strehl Definition. The Rayleigh limit defines a maximum value of wavefront aberration at $\lambda/4$ or less. Strehl Definition, or "SD," defines the standard deviation of wavefront aberration at $\lambda/14$ or less. $\lambda$ is the wavelength of the light source. Collected beams in these cases will be safely regarded as ideal. The P-V value refers to a maximum of the absolute value, that is, a maximum when the value is positive and a minimum when the value is negative.

In the present embodiment, to detect a magnitude of aberration correction which results in a maximum RF level, sampling points are provided in a region where the RF level changes greatly with the magnitude of spherical aberration correction. In the figure, four sampling points (SA1 to SA4) are provided as an example. An approximation curve L1 is then computed using computing circuitry to define the magnitude of aberration correction at which the approximation curve L1 reaches the peak, that is, the optimal magnitude of aberration correction SABEST. When the actually RF signal does not show a distinct peak or bottom, this technique is still capable of determining a single virtual peak or bottom, hence a single optimal magnitude of aberration correction SABEST.

The sampling points may be more or less than four. The approximation curve L1 can be computed with at least two points. With less sampling points involved, computing becomes easier, the computing circuitry arrangement becomes less complicated, and the magnitude of correction is obtained more quickly. With more sampling points involved, the approximation curve L1 becomes more accurate, and the magnitude of aberration correction is more accurately observed.

Calculating the approximation curve L1 by multiple term approximation requires relatively easy formulae, and is implemented by relatively small-scale computing circuitry or software. Various interpolations, including spline interpolation, are also available. Spline interpolation would produce a fewer errors. The computing circuitry that calculates the approximation curve L1 and the magnitude of aberration correction may be provided by a microcomputer which is programmed to perform the circuitry's functions, a DSP (digital signal processor) which incorporates dedicated computing functions, or analog circuitry.

The sampling points may be determined based on a predetermined, recorded magnitude of correction. Alternatively, the RF level may be observed while varying the magnitude of correction. When the RF level matches a prerecorded, target sampling RF value, the magnitude of correction producing that RF value is sampled.

Note that the foregoing description assumes the RF level as the reference as an example. Alternatively, the reference may be the tracking error level. When this is the case, aberration is corrected more accurately, which would be useful in directly employing the signal level of which the quality needs be ensured by the optical pickup as an evaluation value of the reference signal. Further, the tracking error signal, i.e. the reference signal, has a great amplitude and high sensitivity; therefore, the aberration correction is more resistant to noise and other external disturbances. Further, one can use the information signal as the reference signal, and jitter or BER (bit error rate), which is highly related to information signal quality, as the evaluation value of the reference signal. In this case, accurate spherical aberration is again possible.

Figure 5:
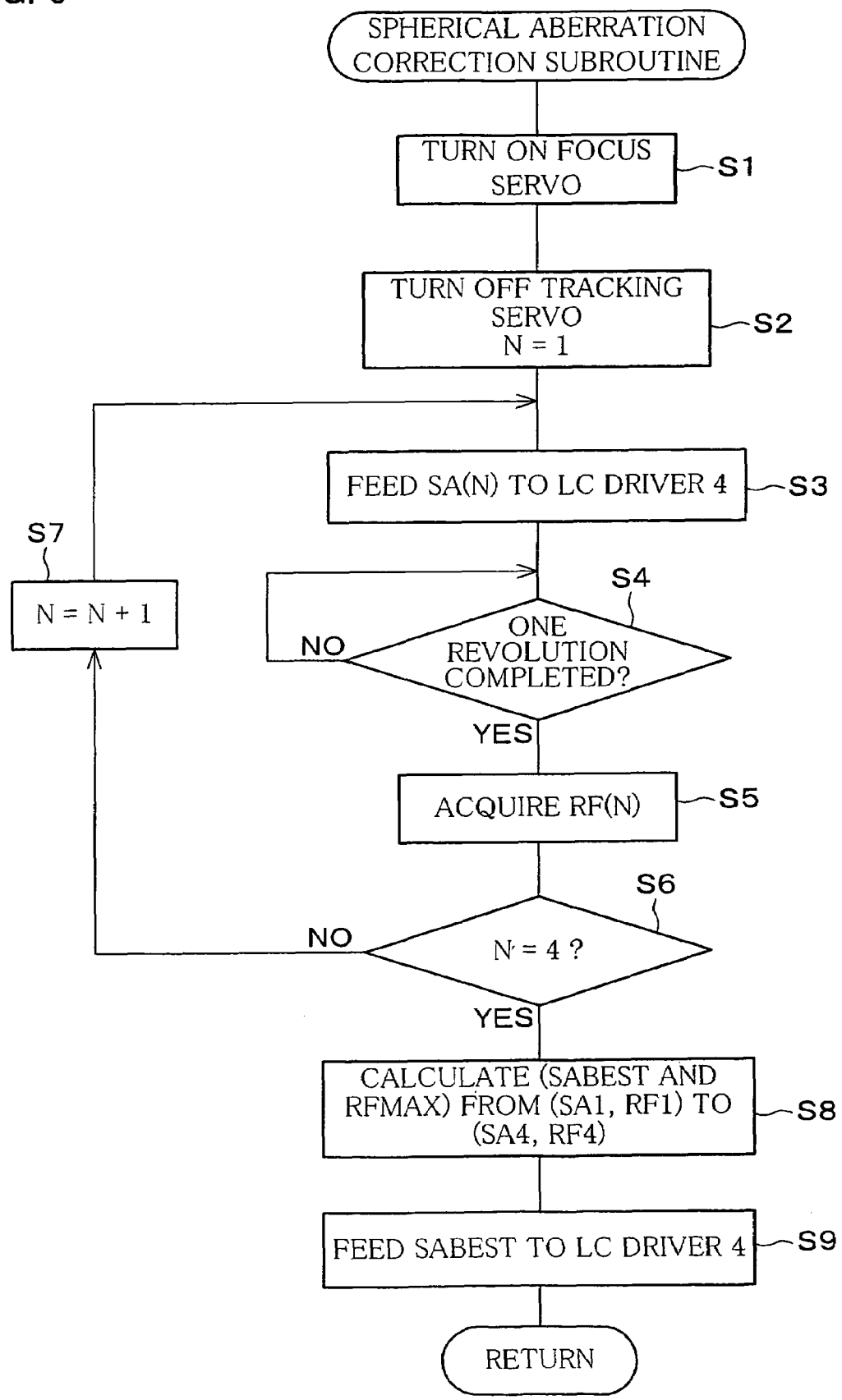
FIG. 5 is a flow chart depicting the steps of a spherical aberration correction subroutine in the FIG. 1 embodiment.

FIG. 5 illustrates an example of specific procedures up to the determination of the magnitude of spherical aberration correction in the present embodiment. The control circuit 50, or control means, performs a control operation in accordance with a main routine omitted in the figure so that the optical information read device can perform various read/write operations. If the optical disc 40 is inserted in the optical information read device while the control circuit 50 is executing the main routine, the circuit 50 switches its operation to a spherical aberration correction subroutine. Procedures of the subroutine are shown in FIG. 5. The control circuit 50 stores, in a built-in register, spherical aberration correction signals SA(1) to SA(4) corresponding to the magnitudes of spherical aberration at the aforementioned four sampling points.

In first step S1, the control circuit 50 supplies a focus servo switching signal FS representing a logic 1 to the servo loop switch 5 to turn on the focus servo. In next step S2, the control circuit 50 supplies a tracking servo switching signal TS representing a logic 0 to the servo loop switch 6 to turn off the tracking servo, and sets/initialize a variable N to 1.

In step S3, the control circuit 50 retrieves the spherical aberration correction signal SA(N) from the built-in register for output to the liquid crystal driver 4. As a result of step S3, the liquid crystal driver 4 generates a liquid crystal drive voltage CV in accordance with the value represented by the spherical aberration correction signal SA(N) for output to the liquid crystal panel 25. Therefore, when the liquid crystal panel 25 illuminated by a laser beam, a phase difference develops between the rays of light passing through the area covered with the circular band of transparent electrode E2 as shown in FIG. 2 and the rays of light passing through the other areas in accordance with the spherical aberration correction signal SA(N). The spherical aberration is hence tentatively corrected.

In next step S4, the control circuit 50 determines, based on the revolution signal RT from the spindle motor 30, whether the optical disc 40 has completed one revolution. The determination is repeated until the optical disc 40 completes a revolution. If the optical disc 40 is determined in step S4 to have completed a revolution, the control circuit 50 in step S5 acquires a RF signal as RF(N). Next, in step S6, the control circuit 50 determines whether N=4. If it is determined in the step that N is not equal to 4, the control circuit 50 proceeds to step S7 where N is incremented by 1 before returning to step S3 where the circuit 50 retrieves the spherical aberration correction signal SA(N) from the built-in register. Steps S3 to S7 are repeated.

Steps S3 to S6 are repeated four times while the magnitude of spherical aberration correction by the liquid crystal panel 25 is being changed for every repetition, for example, from SA(1) to SA(4). The spherical aberration correction signals SA(1), SA(2), SA(3), SA(4), each representing a magnitude of correction, are preferably those producing great changes in the RF level. Provided that two of the four points are close to a maximum magnitude of correction, the other two close to a minimum magnitude of correction, and the maximum magnitude of correction is divided by 16, SA(1) will be designated to be equivalent to $\frac{1}{16}$ of the maximum magnitude of correction, SA(2) to $\frac{2}{16}$, SA(3) to $\frac{15}{16}$, and SA(4) to $\frac{16}{16}$.

Next, if the control circuit 50 determines in step S6 that N=4, the circuit 50 proceeds to step S8 where the circuit 50 determines the optimal magnitude of aberration correction SABEST giving a maximum RF signal level RFMAX on an approximation curve. The control circuit 50 computes the approximation curve from sampling data, that is, the four magnitudes of spherical aberration correction corresponding to the spherical aberration correction signals SA(1) to SA(4) and the RF signals RF(1) to RF(4) each resulting from a different one of the four magnitudes of spherical aberration correction. In next step S9, the control circuit 50 then feeds a signal representing the optimal magnitude of spherical aberration correction SABEST, or final spherical aberration correction signal, to the liquid crystal driver 4.

In other words, step S9 specifies the optimal magnitude of spherical aberration correction SABEST as the final magnitude of spherical aberration correction and drives the liquid crystal panel 25 so as to give the rays passing through the area covered with the transparent electrode E2 in FIG. 2 a phase difference in accordance with this magnitude of correction. The driving performs the final spherical aberration correction. Following step S9, the control circuit 50 leaves this spherical aberration correction subroutine to return to the main routine. This routine enables accurate determination of an optimal magnitude of spherical aberration correction at short detection time for accurate correction.

The spherical aberration correction signal SA may be retrieved for any number of times, although it is retrieved four times in the operation in FIG. 5. Further, in the present embodiment, the amplitude of the RF signal is used in various processing; the amplitude of the tracking error signal or the servo gain of the tracking servo may be used in place of the amplitude of the RF signal.

Also, the liquid crystal panel 25 may have concentric circular rings of transparent electrodes, instead of the single circular band of transparent electrode E2 in FIG. 2, on its liquid crystal layer CL. The rings of transparent electrodes will provide areas of differing phase differences in accordance with the spherical aberration which may differ near the circumference and near the center under the beam spot, which in turn enables elaborate spherical aberration correction. The voltages applied to the rings of transparent electrodes are weighted according to the spherical aberration pattern.

Embodiment 2

Figure 6:
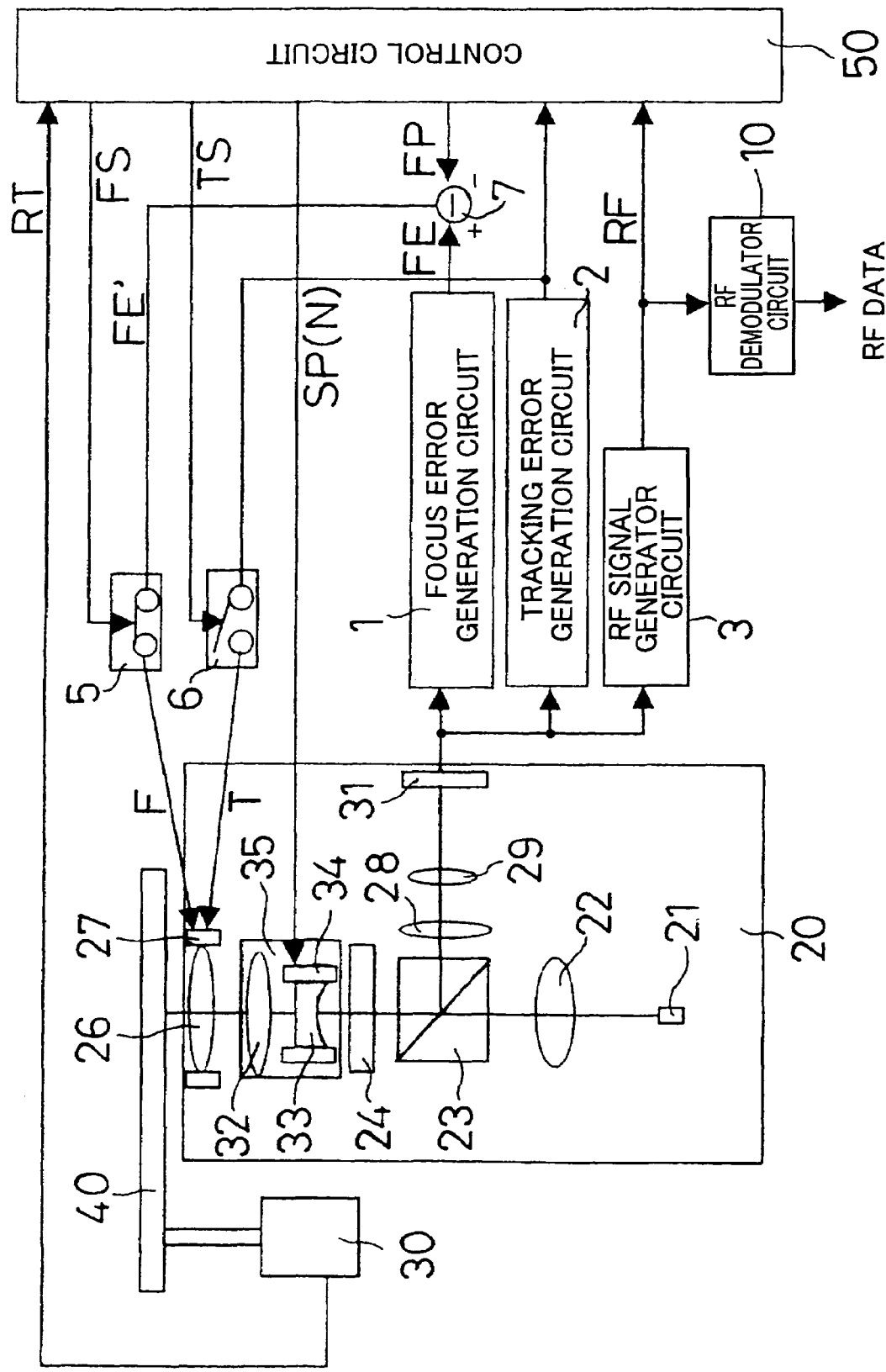
FIG. 6 is a schematic block diagram depicting the construction of an optical pickup which is another embodiment of the present invention.

The following will describe the second embodiment of the present invention in detail with reference to figures. FIG. 6 illustrates the construction of an optical pickup which is the second embodiment of the present invention. In FIG. 6, a pickup 20 emits a read beam onto an optical disc 40 as an optical storage medium which rotates as driven by a spindle motor 30, and receives a reflection from the disc 40. In the driving, for every revolution of the optical disc 40, the spindle motor 30 generates a revolution signal RT for output to a control circuit 50. After shining a read beam onto the optical disc 40 and receiving its reflection, the pickup 20 converts that incoming light to an electric signal for output to a focus error generation circuit 1, a tracking error generation circuit 2, and a RF signal generator circuit 3.

The pickup 20 contains a laser producing element 21, a collimating lens 22, a beam splitter 23, a quarter-wave plate 24, a beam expander 35, a beam expander actuator 34, an objective lens 26, a focusing tracking actuator 27, a collective lens 28, a cylindrical lens 29, and an optical sensor 31. The laser producing element 21 generates a laser beam at a predetermined light power. The laser beam enters the beam expander 35 which is provided to correct spherical aberration caused by the irregular thickness of the transparent substrate of the optical disc 40.

The beam expander 35 is, for example, a beam-expanding relay lens containing a pair of a concave lens 33 and a convex lens 32. The expander 35 is adapted normally to receive incident parallel rays of light and projects parallel rays with an expanded beam diameter. The concave lens 33 and the convex lens 32 changes the distance separating the two lenses so as to either diverge or converge the light hitting the objective lens 26 which hence produces spherical aberration. With these actions, the beam expander 35 can function as correcting means which corrects the spherical aberration caused by the irregular thickness of the transparent substrate of the optical disc 40. The beam expander 35 and the objective lens 26, if not correctly positioned relative to each other, little affects the occurrence of spherical aberration, and thus require only relatively easy adjustment when integrated into an optical pickup.

The objective lens 26 collects the laser beam coming from the beam expander 35 onto a recording track on the recording surface of the optical disc 40 as the aforementioned read beam. As to focusing, the focusing tracking actuator 27 moves the objective lens 26 in a direction normal to the recording surface of the optical disc 40, or so-called focusing trajectory, by an amount in accordance with a focus drive signal F fed via a servo loop switch 5. As to tracking, the focusing tracking actuator 27 moves the optical axis of the objective lens 24 in the radial direction of the optical disc 40 by an amount which is in accordance with a tracking drive signal T fed via a servo loop switch 6.

The reflection of the read beam illuminating the recording track of the optical disc 40 travels through the objective lens 26, the beam expander 35, and the quarter-wave plate 24, diverts in the beam splitter 23, and travels on through the collective lens 28 and the cylindrical lens 29 before hitting the light receiving face of the optical sensor 31 which is depicted in FIG. 3.

Referring to FIG. 3, the optical sensor 31 has four independent light receiving elements A to D which are arranged as shown in the figure with respect to the track direction. The light receiving elements A to D receive reflection from the optical disc 40 and convert it to respective electric signals, or photoelectric converted signals RA to RD, for output. The focus error generation circuit 1 adds the outputs of the light receiving elements A to D which are located at diagonal positions across the optical sensor 31 to produce two sums. The circuit 1 then supplies the difference between the sums (focus error signal FE) to the subtracter 7. In other words, the focus error generation circuit 1 supplies a focus error signal FE=(RA+RC)−(RB+RD) to the subtracter 7. The subtracter 7 subtracts a position-on-focusing-trajectory signal FP from the focus error signal FE and feeds a resulting focus error signal FE' to the servo loop switch 5. The subtracter 7 is fed with the signal FP by the control circuit 50. The servo loop switch 5 turns on/off in accordance with a focus servo switching signal FS fed from the control circuit 50.

For example, the servo loop switch 5 turns off when the focus servo switching signal FS is a logic 0 indicating a focus servo turn-off. When the focus servo switching signal FS is a logic 1 indicating a focus servo turn-on, the switch 5 turns on and starts supplying a focus drive signal F to the focusing tracking actuator 27 in accordance with the focus error signal FE'. In other words, a system including the pickup 20, the focus error generation circuit 1, the subtracter 7, and the servo loop switch 5 constitutes a so-called focus servo loop. Owing to this focus servo loop, the objective lens 26 maintains its position on the focusing trajectory in accordance with the position-on-focusing-trajectory signal FP.

The tracking error generation circuit 2 adds the outputs of the light receiving elements A to D of the optical sensor 31 which are located adjacent to each other in the track direction to produce two sums. The circuit 2 then supplies the difference between the sums (tracking error signal) to the servo loop switch 6. In other words, the circuit 2 supplies a tracking error signal (RA+RD)−(RB+RC) to the switch 6. The servo loop switch 6 turns on/off in accordance with a tracking servo switching signal TS fed from the control circuit 50.

For example, when the tracking servo switching signal TS is a logic 1 indicating a tracking servo turn-on, the servo loop switch 6 turns on and starts supplying a tracking drive signal T to the focusing tracking actuator 27 in accordance with the tracking error signal. When the tracking servo switching signal TS is a logic 0 indicating a tracking servo turn-off, the switch 6 turns off, suspending the supplying of the tracking drive signal T to the focusing tracking actuator 27.

The RF signal generator circuit 3 adds the photoelectric converted signals RA to RD to produce a sum (information readout signal) representing information data on the optical disc 40. The circuit 3 then feeds the information readout signal to a RF demodulator circuit 10 and the control circuit 50. The RF demodulator circuit 10 performs predetermined demodulation on the information readout signal to recover the information data (RF data representing reproduced information) for output.

Figure 7:
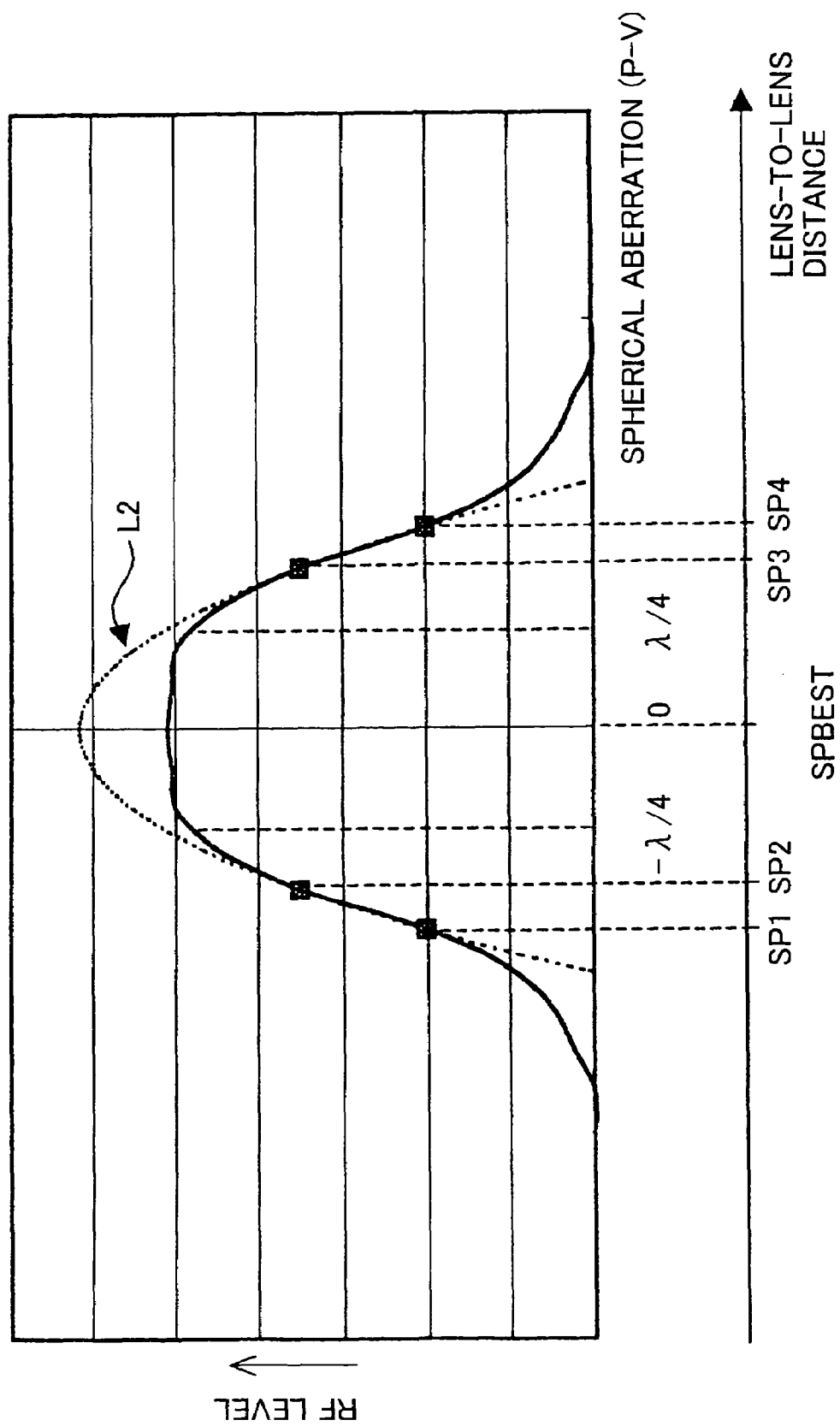
FIG. 7 is a graph depicting the relationship between spherical aberration and a RF level in the FIG. 6 embodiment.

FIG. 7 shows the RF level of the information readout signal changing with spherical aberration correction when the FIG. 6 optical pickup has spherical aberration left uncorrected. The spherical aberration is corrected by changing the lens distance of the beam expander 35. Plotting the P-V value of the spherical aberration of the device on the horizontal axis and the RF level of the information signal on the vertical axis, the RF level is a maximum when the spherical aberration is 0. The RF level however hardly changes where the spherical aberration is less than or equal to a reference value for optical characteristics evaluation. Well-known reference values for evaluation are the Rayleigh limit and Strehl Definition. The Rayleigh limit defines a maximum value of wavefront aberration at $\lambda/4$. Strehl Definition, or "SD," defines the standard deviation of wavefront aberration at $\lambda/14$ or less. $\lambda$ is the wavelength of the light source. Collected beams in these cases will be safely regarded as ideal.

In the present embodiment, to detect a lens distance which results in a maximum RF level, sampling points are provided in a region where the RF level changes greatly with the magnitude of spherical aberration correction. In the figure, four sampling points (SP1 to SP4) are provided as an example. An approximation curve L2 is then computed using computing circuitry to define a lens distance at which the approximation curve L2 reaches the peak, that is, an optimal lens distance SPBEST resulting in an optimal aberration correction. The sampling points may be more or less than four. The approximation curve L2 can be computed with at least two points. With less sampling points involved, computing becomes easier, the computing circuitry arrangement becomes less complicated, and the magnitude of correction is obtained more quickly. With more sampling points involved, the approximation curve L2 becomes more accurate, and the lens distance is more accurately observed.

The approximation curve L2 may be computed by various interpolation techniques, including multiple term approximation and spline interpolation. The computing circuitry that calculates the approximation curve L2 and the lens distance may be provided by a microcomputer which is programmed to perform the circuitry's functions, a DSP (digital signal processor) which incorporates dedicated computing functions, or analog circuitry.

The sampling points may be determined based on a predetermined, recorded lens distance. Alternatively, the RF level may be observed while varying the lens distance. When the RF level matches a prerecorded, target sampling RF value, the lens distance producing that RF value is sampled.

Note that the foregoing description assumes the RF level as the evaluation reference as an example. Alternatively, the reference may be the tracking error level, jitter, or BER (bit error rate) as the evaluation reference.

Figure 8:
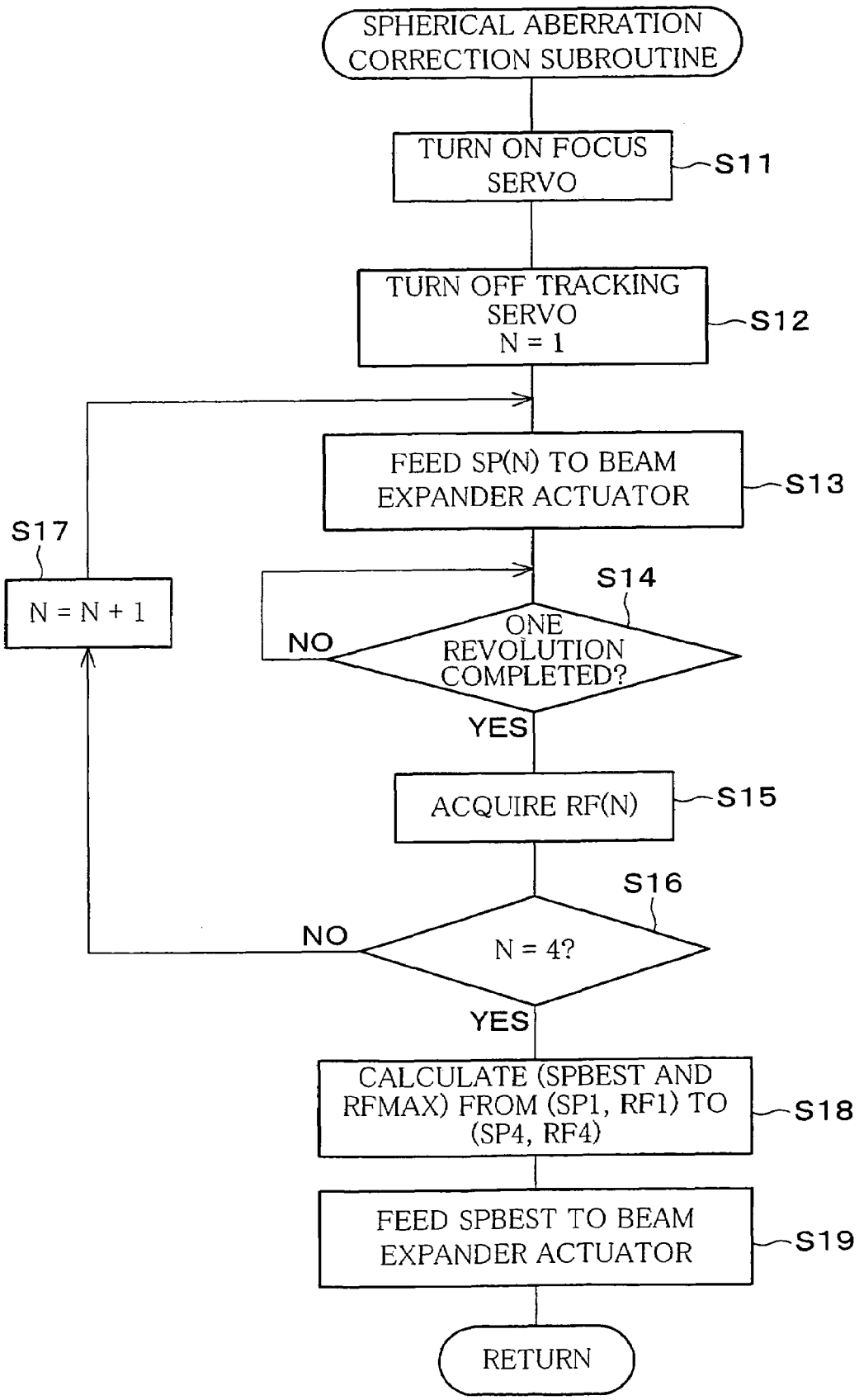
FIG. 8 is a flow chart depicting the steps of a spherical aberration correction subroutine using a beam expander as aberration correction means in the FIG. 6 embodiment.

FIG. 8 illustrates an example of specific procedures up to the determination of the lens distance for spherical aberration correction in the present embodiment. The control circuit 50, or control means, performs a control operation in accordance with a main routine omitted in the figure so that the optical information read device can perform various read/write operations. If the optical disc 40 is inserted in the optical information read device while the control circuit 50 is executing the main routine, the circuit 50 switches its operation to a spherical aberration correction subroutine. Procedures of the subroutine are shown in FIG. 8. The control circuit 50 stores, in a built-in register, lens distance signal SP(1) to SP(4) corresponding to the lens distance SP1 to SP4 at the aforementioned four sampling points.

In step S11, the control circuit 50 supplies a focus servo switching signal FS representing a logic 1 to the servo loop switch 5 to turn on the focus servo. In next step S12, the control circuit 50 supplies a tracking servo switching signal TS representing a logic 0 to the servo loop switch 6 to turn off the tracking servo, and sets/initialize a variable N to 1.

In step S13, the control circuit 50 retrieves the lens distance signal SP(N) from the built-in register for output to the beam expander drive actuator 34. As a result of step S3, the beam expander drive actuator 34 drives the beam expander 35 so that the lens distance is in accordance with the value of the lens distance signal SP(N). Therefore, non-parallel light hits the objective lens 26, producing spherical aberration in accordance with the lens distance signal SP(N). The spherical aberration is hence tentatively corrected.

In next step S14, the control circuit 50 determines, based on the revolution signal RT from the spindle motor 30, whether the optical disc 40 has completed one revolution. The determination is repeated until the optical disc 40 completes a revolution. In next step S15, the control circuit 50 acquires a RF signal level as RF(N). Next, in step S16, the control circuit 50 determines whether N=4. If it is determined in the step that N is not equal to 4, the control circuit 50 proceeds to step S17 where N is incremented by 1 before returning to step S13 where the circuit 50 retrieves the lens distance signal SP(N) from the built-in register to tentatively correct the spherical aberration. Steps S13 to S17 are repeated.

Steps S13 to S17 are repeated four times while the lens distance of the beam expander 35 producing spherical aberration correction is being changed for every repetition, for example, in accordance with the lens distance signals SP(1) to SP(4). The lens distance signals SP(1), SP(2), SP(3), SP(4), each representing a magnitude of correction, are preferably those producing great changes in the RF level. Provided that two of the four points are close to a maximum lens distance, the other two close to a minimum lens distance, and the signal magnitude corresponding to the maximum lens distance is divided by 16, SP(1) will be designated to be equivalent to 1/16 of the maximum lens distance, SP(2) to 2/16, SP(3) to 15/16, and SP(4) to 16/16.

If the control circuit 50 determines in step S16 that N=4, the circuit 50 proceeds to step S18 where the circuit 50 determines the optimal lens distance SPBEST giving a maximum RF signal level RFMAX on the approximation curve L2 in FIG. 7. The control circuit 50 computes the approximation curve L2 from sampling data, that is, the four lens distances SP1 to SP4 corresponding to the lens distance signals SP(1) to SP(4) and the RF signal levels RF1 to RF4 each resulting from a different one of the four lens distances. In step S19, the control circuit 50 then feeds a signal representing the optimal lens distance SPBEST, or a lens distance signal for final spherical aberration correction, to the beam expander drive actuator 34. In other words, step S19 specifies the lens distance corresponding to the optimal lens distance SPBEST as the final lens distance and gives the objective lens 26 a spherical aberration of which the amount is in accordance with the lens distance, so as to cancel the spherical aberration caused by the irregular thickness of the transparent substrate of the optical disc. The step performs the final spherical aberration correction. Following step S19, the control circuit 50 leaves this spherical aberration correction subroutine to return to the main routine.

This routine enables accurate determination of an optimal magnitude of spherical aberration correction at short detection time for accurate correction. The lens distance signal SP(N) may be adjusted for any number of times, although it is adjusted four times in the operation in FIG. 8. Further, in the present embodiment, the amplitude of the RF signal is used in various processing; the amplitude of the tracking error signal or the servo gain of the tracking servo may be used in place of the amplitude of the RF signal.

In the beam expander 35 in FIG. 6, the concave lens 33, which is the smaller of the two lenses, is moved. This structure has effectively reduced the driving power and physical size of the beam expander drive actuator 34. The convex lens 32 or both lenses may be moved. The beam expander 35 provides an expanding optical system with the concave lens 33 and the convex lens 32 being placed in this order in the optical path. Alternatively, the convex lens 32 and the concave lens 33 may be placed in this order to form a narrowing optical system.

The optical pickup tolerance for the wavefront aberration (standard deviation) is $\lambda/14$. However, the tolerance for the spherical aberration is preferably about 35 m$\lambda$ in the present embodiment when the following contributions to the overall wavefront aberration, other than that caused by the thickness irregularity of the transparent substrate, are also considered: namely, the wavefront aberration caused by the optical components in the pickup 20 itself, the wavefront aberration caused by a tilting disc, and the aberration upon defocusing which occurs with a focus offset remaining when the readout from the optical disc 40 is subjected to focus servo.

Figure 9:
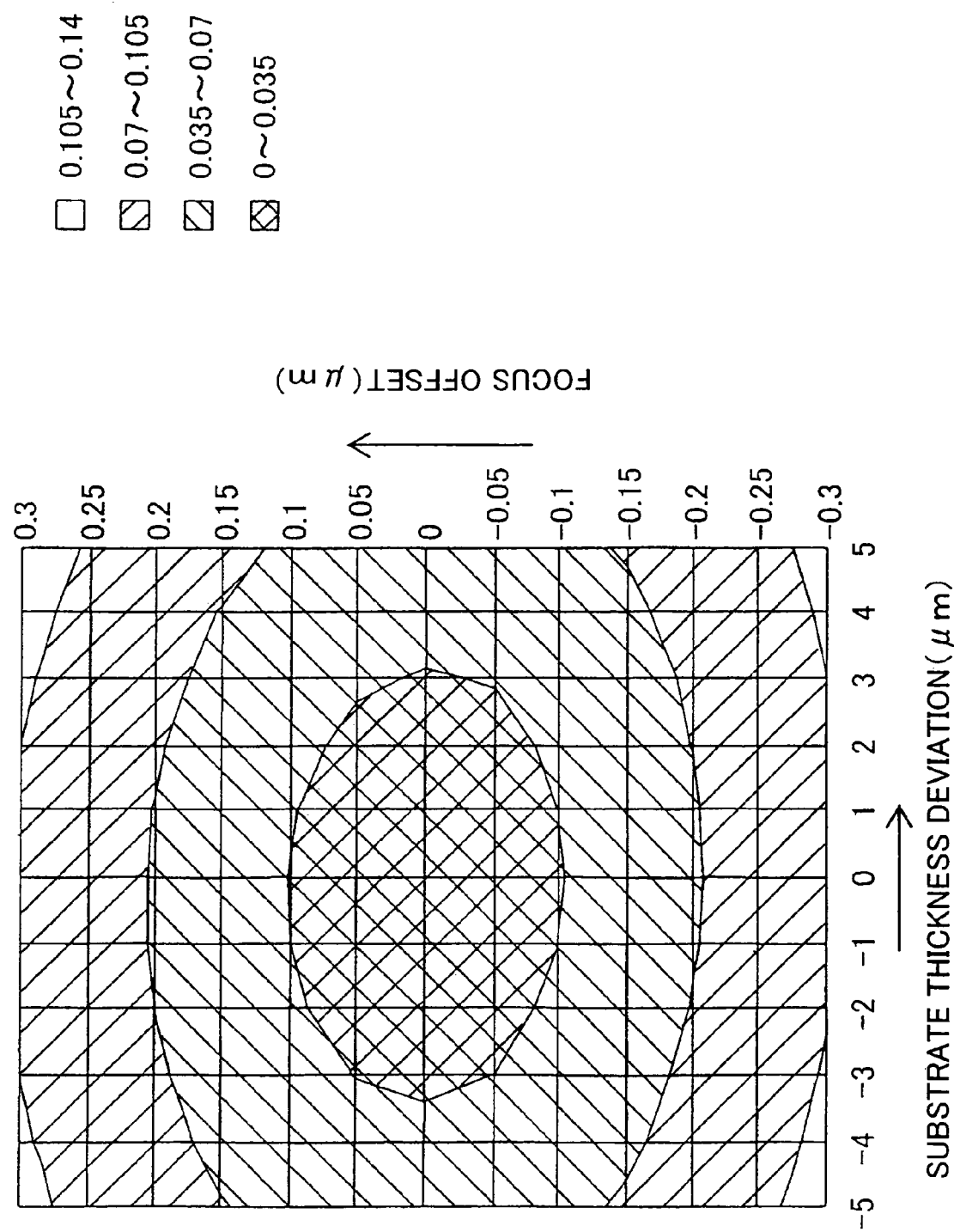
FIG. 9 is a graph depicting calculated values of wavefront aberration which occurs in the presence of a substrate thickness deviation and focus offset.

Specific examples will be given now. FIG. 9 shows simulation of wavefront aberration in the presence of substrate thickness deviations and focus offsets. The objective lens NA (numerical aperture) is set to 0.85, the transparent substrate thickness in an ideal disc to 0.1 mm, and the beam scale up ratio of the beam expander 35 to 1.5. The substrate thickness deviation is plotted in μm on the horizontal axis. The F (focus) offset is plotted in μm on the vertical axis. The wavefront aberration values are indicated in rms, relative to the wavelength $\lambda$. The figure tells that the thickness deviation which can tolerate a wavefront aberration of 35 m$\lambda$ or less is about −3.5 to 3 μm when the focus offset is 0.

Figure 10:
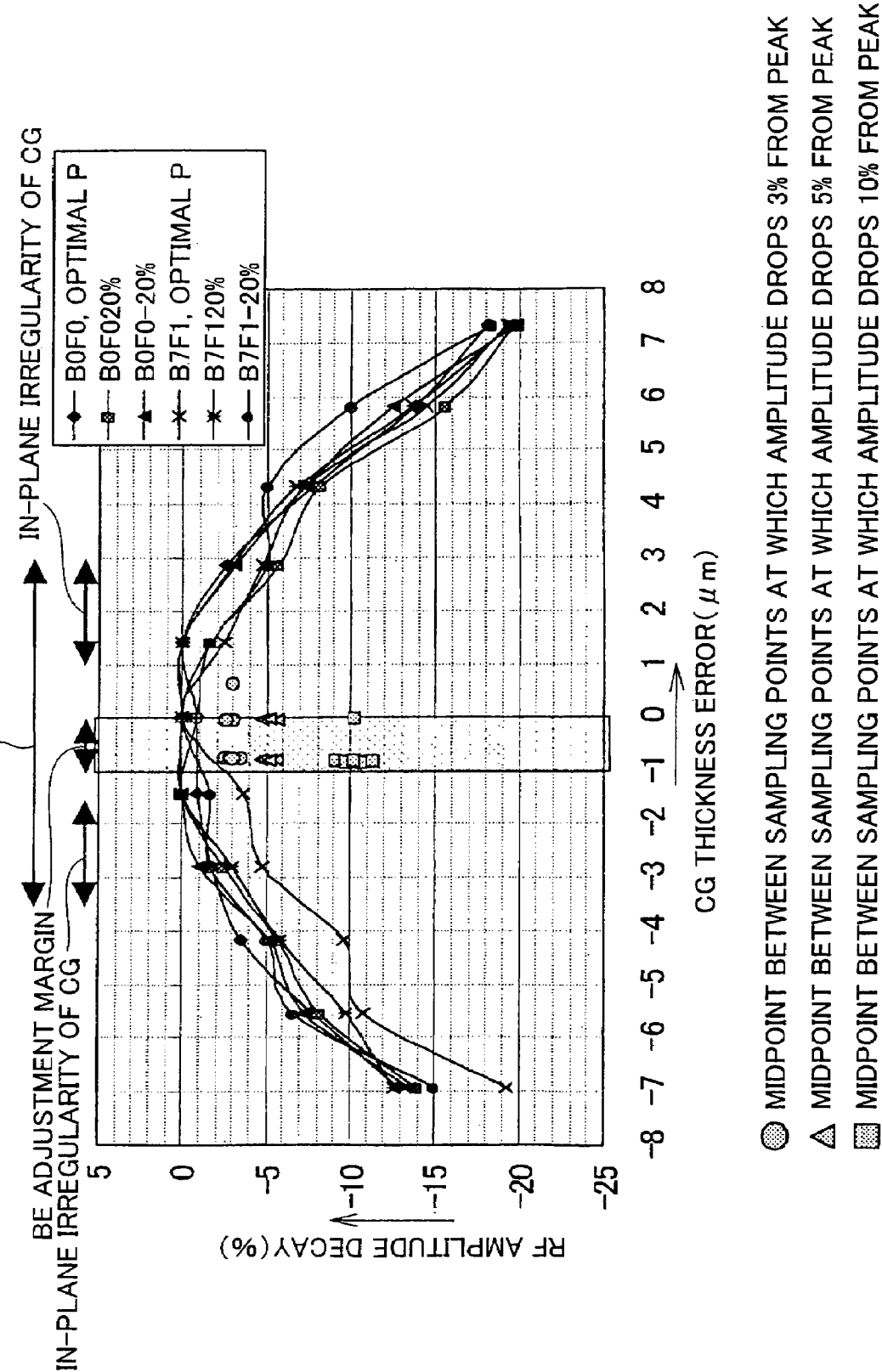
FIG. 10 is a graph depicting measurements of maximum RF signal amplitude changes in reproducing RF random data recorded under six different sets of conditions.

FIG. 10 shows measurements of maximum RF signal amplitude changes in reproducing RF random data recorded under the following six different sets of conditions. The horizontal axis indicates a substrate thickness deviation equivalent of the wavefront aberration produced by the beam expander (BE) 35 in the reproduction operation. A sampling interval is equivalent to a substrate thickness deviation of about 1.5 μm. (For example, a CG thickness error of 1 μm is equivalent to a wavefront aberration produced by the beam expander 35 when the substrate thickness is 1 μm thicker than designed.)

Recording Conditions:

(i) Optimal write power at zero aberration and zero F offset (B0F0).

(ii) Write power 20% more than optimal at zero aberration and zero F offset (B0F0).

(iii) Write power 20% less than optimal at zero aberration and zero F offset (B0F0).

(iv) Optimal write power at aberration equivalent to 7 μm thickness irregularity of a transparent substrate and F offset of −0.1 μm (B7F1).

(v) Write power 20% more than optimal at aberration equivalent to 7 μm thickness irregularity of a transparent substrate and F offset of −0.1 μm (B7F1).

(vi) Write power 20% less than optimal at aberration equivalent to 7 μm thickness irregularity of a transparent substrate and F offset of −0.1 μm (B7F1).

Now, assuming the foregoing tolerable thickness deviation of −3.5 to 3 μm and a thickness deviation between individual optical discs 40 of ±2 μm, the optical pickup can tolerate spherical aberration equivalent to a thickness deviation of −1 to 1.5 μm. Further, specifying a margin that is equivalent to the thickness deviation of ±0.5 μm as a controlled positional error of the beam expander 35, the tolerable adjustment error for the beam expander 35 is −1 to 0.5 μm.

As shown in the figure, for each data set obtained under the six sets of recording conditions, a ○ indicates the midpoint between the sampling points, on either side of the sampling point representing a peak amplitude, at which the amplitude drops 3% or more for the first time from the peak; a Δ indicates the midpoint between the sampling points, on either side of the sampling point representing a peak amplitude, at which the amplitude drops 5% or more for the first time from the peak; and a □ indicates the midpoint between the sampling points, on either side of the sampling point representing a peak amplitude, at which the amplitude drops 10% or more for the first time from the peak. Some ○ points fall out of the tolerable adjustment error range, −1 to 0.5 μm, for the beam expander 35. The other points, Δ and □, are within that tolerable range. Accordingly, suitable RF levels for sampling are at least 5% less than the peak amplitude. When this is the case, the beam expander 35 can be adjusted more accurately irrespective of the recording conditions of the reproduced data.

Figure 11:
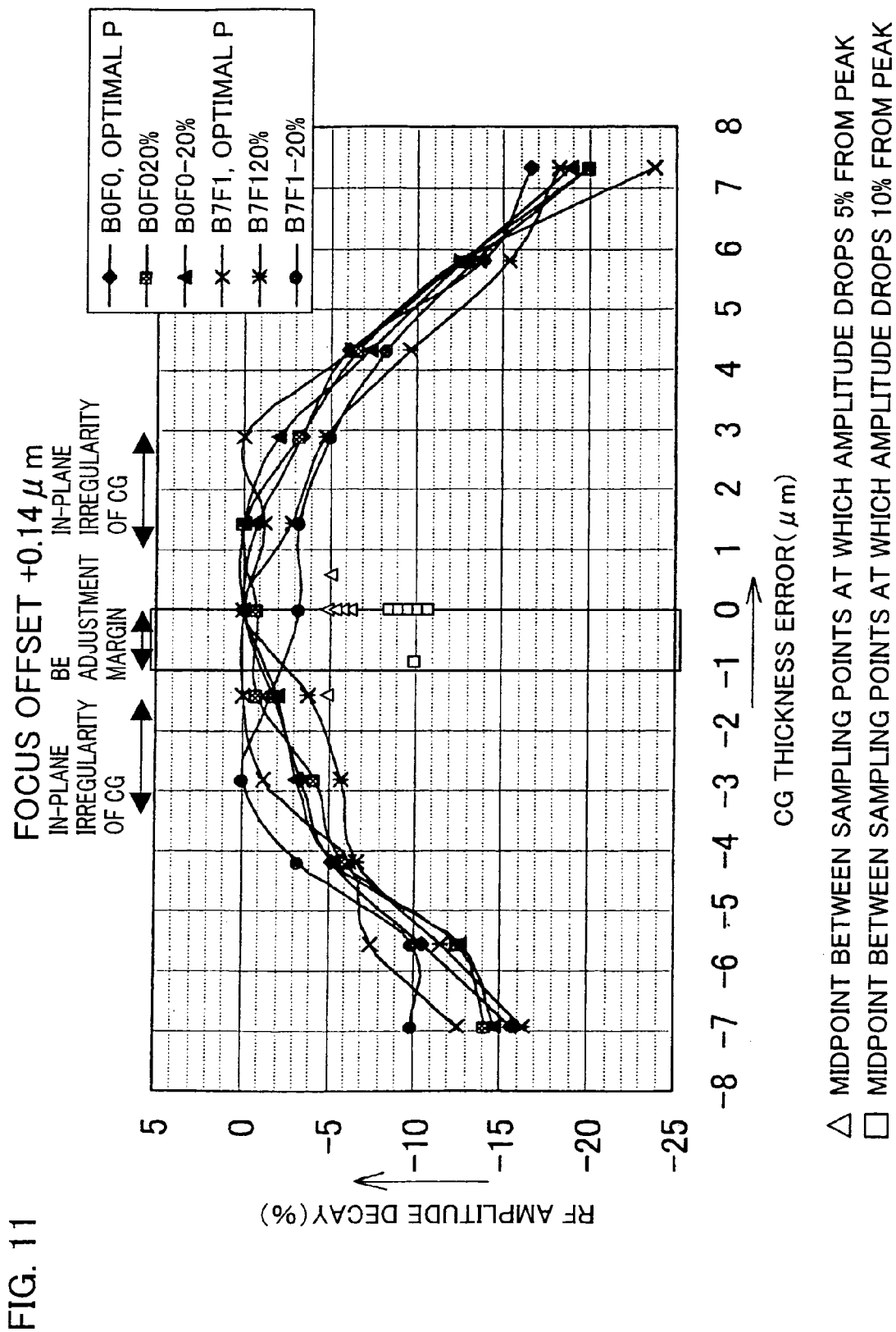
FIG. 11 is a graph depicting measurements of maximum RF signal amplitude changes in reproducing RF random data recorded under six different sets of conditions with a remaining focus offset of +0.14 µm.

FIG. 11 shows measurements of maximum RF signal amplitude changes in reproducing RF random data recorded under the foregoing six different sets of conditions. There is a remaining focus offset of +0.14 μm. It is assumed that the beam expander (BE) distance is adjusted before the adjustment of the focus offset. Similarly to the previous figure, a Δ point indicates the midpoint between the sampling points, on either side of the sampling point representing a peak amplitude, at which the amplitude drops 5% or more for the first time from the peak; and a □ point indicates the midpoint between the sampling points, on either side of the sampling point representing a peak amplitude, at which the amplitude drops 10% or more for the first time from the peak. Some Δ points fall out of the tolerable adjustment error range, −1 to 0.5 μm, for the beam expander 35. The other, □ points are within that tolerable range. Accordingly, if there remains a focus offset, suitable RF levels for sampling are at least 10% less than the peak amplitude. When this is the case, the beam expander 35 can be adjusted more accurately irrespective of the recording conditions of the reproduce data.

Embodiment 3

Next, a third embodiment of the present invention will be described in detail in reference to figures.

Figure 12:
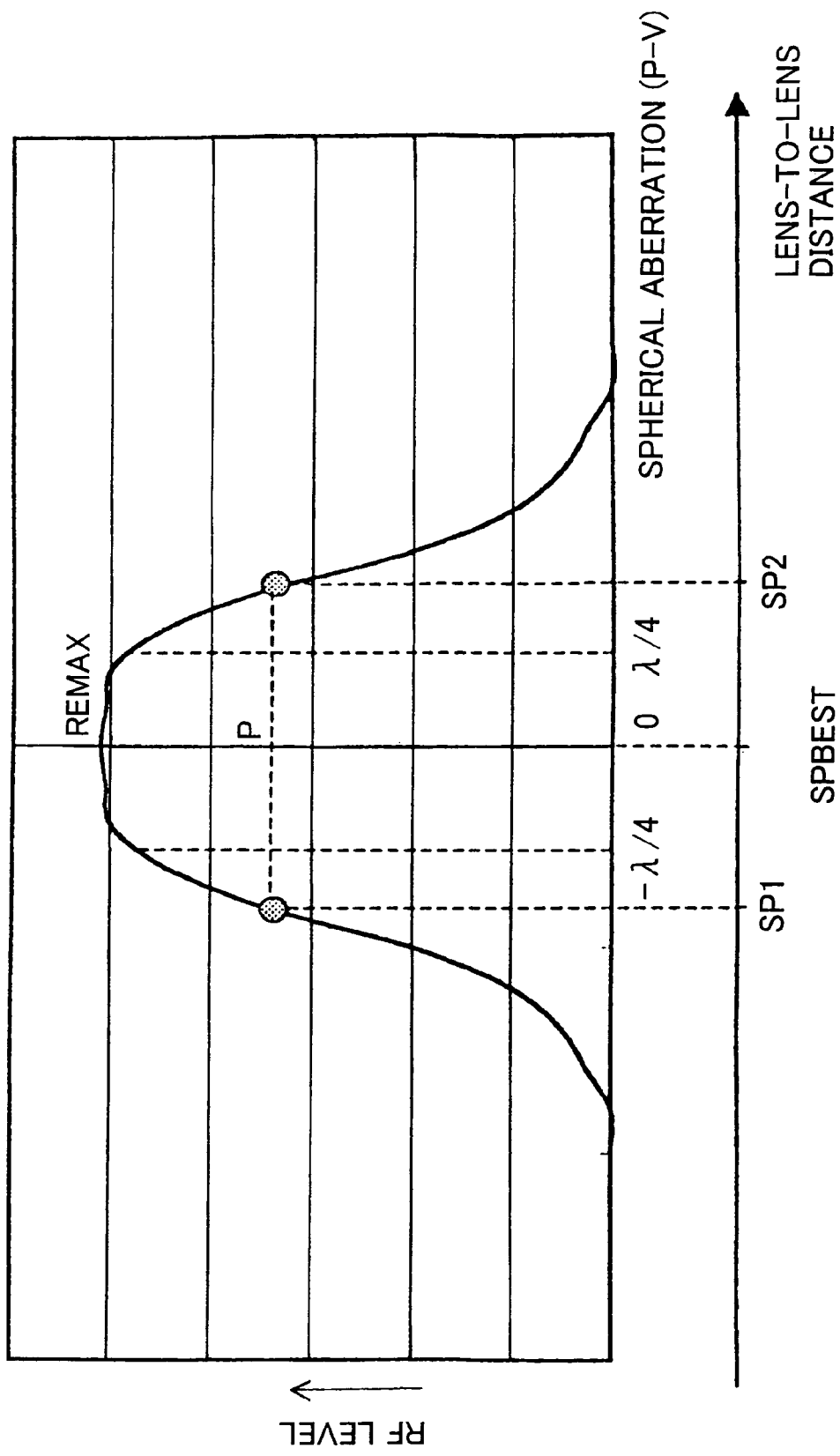
FIG. 12 is a graph depicting the relationship between spherical aberration and a RF level in the third embodiment of the present invention.

FIG. 12 shows the RF level changing with changes of the lens distance of a beam expander 35 in spherical aberration correction. The beam expander 35 here is in an optical pickup of the present embodiment which is arranged similarly to the FIG. 6 embodiment. The optical pickup has a spherical aberration left uncorrected (first spherical aberration). In FIG. 12, similarly to FIG. 7, the spherical aberration of the device is plotted on the horizontal axis, and the RF level of an information signal is plotted on the vertical axis. The RF level is a maximum at zero spherical aberration. The RF level hardly changes at aberrations equal to or less than a reference value for optical characteristics evaluation. Well-known reference values for evaluation are, as mentioned earlier, the Rayleigh limit (defining a maximum value of wavefront aberration at λ/4 or less) and SD (Strehl Definition, defining the standard deviation of wavefront aberration at λ/14 or less). In these cases, we regard the collected beam as being almost ideal.

In the present embodiment, to detect the lens distance when the RF level is a maximum, the lenses are moved to a lens distance SP1 close to a minimum setting in the movable range. Letting the RF level at SP1 be P, the lens distance is gradually increased to find a lens distance SP2 at which the RF level returns to P. Since the lens distances SP1, SP2 fall out of the Rayleigh limits of ±λ/4, the lens distance is greater than λ/2. The optimal lens distance SPBEST for optimal aberration correction is set to (SP1+SP2)/2. According to the method, the optimal lens distance SPBEST is equal to the mean value of the two samplings. This allows for simplification and downsizing of computing circuitry.

This approach is an example where the lens distance SP1 is predetermined. Another approach is to use a predetermined RF level P and detect the lens distances SP1, SP2 at which the RF level equals P. In the latter approach, the lens distance can be detected accurately in the presence of irregular RF level sensitivity between individual devices.

The RF level is not the only possible evaluation reference. The tracking error level, jitter, and BER (bit error rate) are other candidates for evaluation reference.

Figure 13:
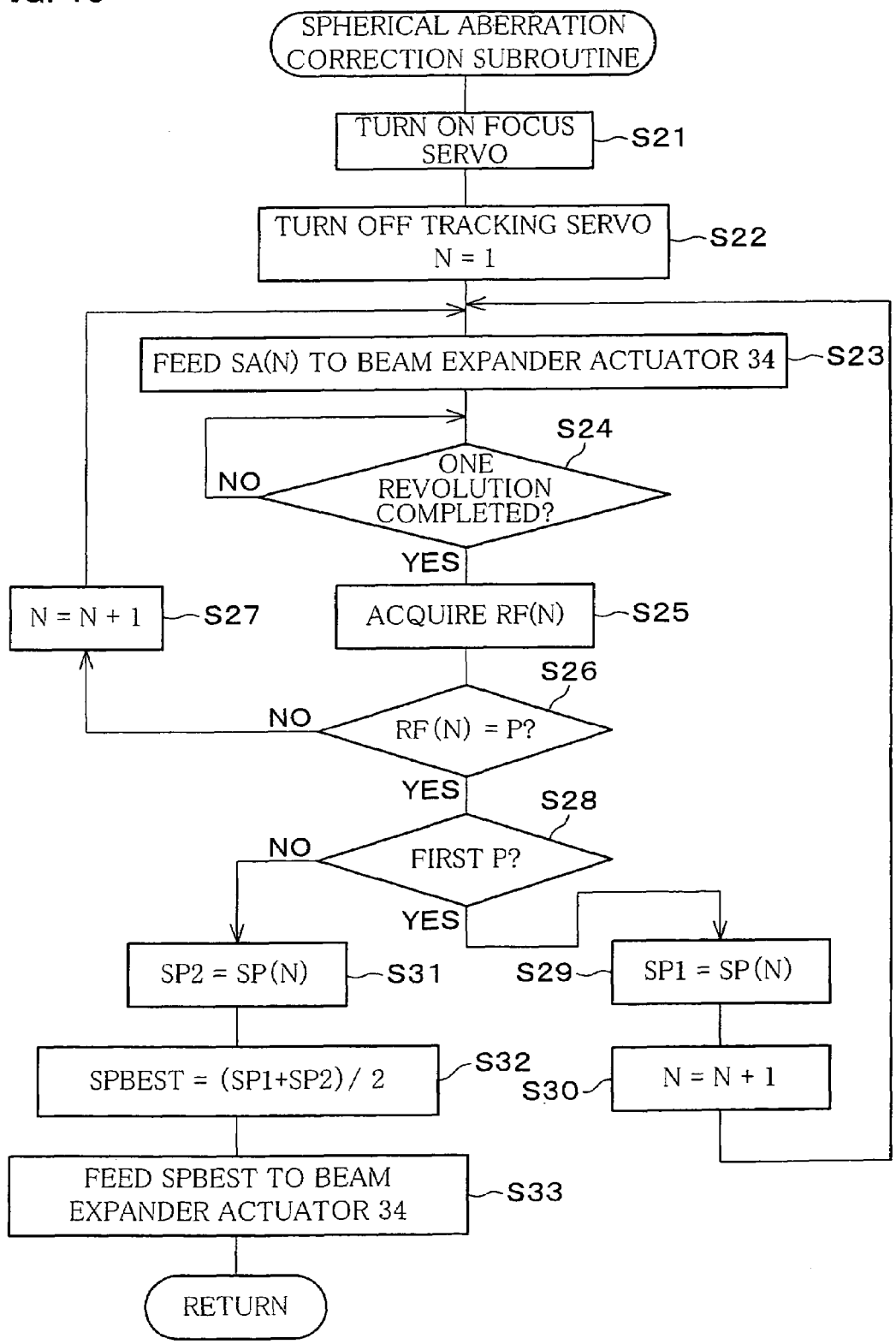
FIG. 13 is a flow chart depicting the steps of a spherical aberration correction subroutine using a beam expander in accordance with the FIG. 12 relationship.

FIG. 13 illustrates specific procedures for determining the lens distance in the present embodiment, as an example. The control circuit 50 executes control operation on the optical pickup in accordance with a main routine (not shown) to implement various read/write actions. If the optical disc 40 is inserted in the optical pickup while the control circuit 50 is executing the main routine, the control circuit 50 proceeds to execute a spherical aberration correction subroutine for the beam expander 35. The subroutine is shown in steps in FIG. 13.

Referring to FIG. 13, in first step S21, the control circuit 50 supplies a "logic 1" focus servo switching signal FS to the servo loop switch 5 to turn on the focus servo. In next step S22, the control circuit 50 supplies a "logic 0" tracking servo switching signal TS to the servo loop switch 6 to turn off the tracking servo. The circuit 50 also initializes N=1.

In step S23, the control circuit 50 outputs a drive signal so that the beam expander drive actuator 34 moves the lenses of the beam expander 35 to a lens distance in accordance with the lens distance signal SP(N). As step S23 is executed, non-parallel light enters the objective lens 26, producing a spherical aberration in accordance with the lens distance signal SP(N). The spherical aberration is thus tentatively corrected. In next step S24, the control circuit 50 determines whether the optical disc 40 has completed one revolution, based on a revolution signal RT fed from the spindle motor 30, and repeats the process until the optical disc 40 completes one revolution. In next step S25, the control circuit 50 acquires the RF signal level and assigns it RF(N). In next step S26, the control circuit 50 determines whether the RF(N) equals the predetermined value P. If RF(N) is not determined to equal P in this step, the control circuit 50 proceeds to step S27 where N is incremented by 1 and returns to step S23. In step S23, the circuit 50 retrieves the lens distance signal SP(N) from the built-in register and carries out sampling. Steps S23 to S27 above are repeated.

If RF(N) is determined to equal P, in step S26, the control circuit 50 proceeds to step S28 to determine whether the RF(N) has reached P for the first time. If RF(N) is determined in step S28 to have reached P for the first time, the control circuit 50 proceeds to step S29 where it stores SP(N) under the name of SP1. In step S30, the control circuit 50 increments N by 1 and returns to step S23 to retrieve the lens distance signal SP(N) from the built-in register. Step S23 to S27 above are repeated.

If in step S28 it is determined that RF(N) has reached P for the second time, the control circuit 50 proceeds to step S31 where it stores SP(N) under the name of SP2. In next step S32, the optimal lens distance SPBEST=(SP1+SP2)/2 is obtained. In step S33, the control circuit 50 supplies the optimal lens distance signal SPBEST to the beam expander drive actuator 34 as a lens distance signal for a final spherical aberration correction. In other words, the execution of step S33 obtains the lens distance corresponding to the optimal lens distance signal SPBEST as a final lens distance and provides the objective lens 26 a spherical aberration in accordance with the lens distance to cancel the spherical aberration produced by the irregular thickness of the transparent substrate of the optical disc (final spherical aberration correction). After step S33, the control circuit 50 leaves the spherical aberration correction subroutine to return to the main routine. This routine enables accurate determination of an optimal magnitude of spherical aberration correction at short detection time for accurate correction.

In the process illustrated in FIG. 13, the lens distance signal SP is allowed to change between the minimum and maximum distances. That minimum-to-maximum range may be divided into, for example, 16 equal intervals within the lens distance resolution capability of the beam expander so that the beam expander can change the lens distance at that interval or less to find SP1 and SP2. When this is the event, a limit is imposed on the number of times the lens distance detection is carried out. The spherical aberration correction subroutine is never repeated exceeding that limit, thus quickly completing the spherical aberration correction.

The present embodiment utilizes the RF signal amplitude in various processing. In place of the RF signal amplitude, a tracking error signal amplitude or a tracking servo gain may be used.

As shown in FIG. 4, FIG. 7, and FIG. 12, the embodiments above evaluate magnitude of correction through a value having a peak which will be regarded as giving the optimal magnitude of correction. The RF signal amplitude is an example of such a value. The embodiments will also work with a value with a bottom giving the optimal magnitude of correction.

Embodiment 4

The present embodiment relates to spherical aberration focus offset correction method for an optical pickup used in optical read/write devices capable of reading/writing high density write once, rewriteable, and like optical discs, as well as to an optical pickup with such a correction function. The following will describe an embodiment of the present invention with reference to figures.

The optical pickup of the present embodiment can be represented by the same block diagram as some of the foregoing optical pickups, i.e., FIG. 6. The function of each block and member is not repeated here.

In the pickup 20, a beam expander 35 acts as correcting means correcting spherical aberration caused by the irregular thickness of a transparent substrate of an optical disc 40.

A position-on-focusing-trajectory signal FP, which will be subtracted from a focus error signal FE to obtain a focus error signal FE', is a signal based on which a current focusing tracking actuator 27 is driven. Subtracting the position-on-focusing-trajectory signal FP from the focus error signal FE yields a signal based on which the actuator is driven because the focus error signal changes from the immediately preceding condition to 0. When this signal is 0, this is interpreted as no focus error having occurred; the focusing tracking actuator 27 is not driven, remaining in the same condition.

An objective lens 26 is moved by an amount in accordance with the focus error signal FE, using the position on a focusing trajectory which is indicated by the position-on-focusing-trajectory signal FP in focus servo as a reference.

Figure 14:
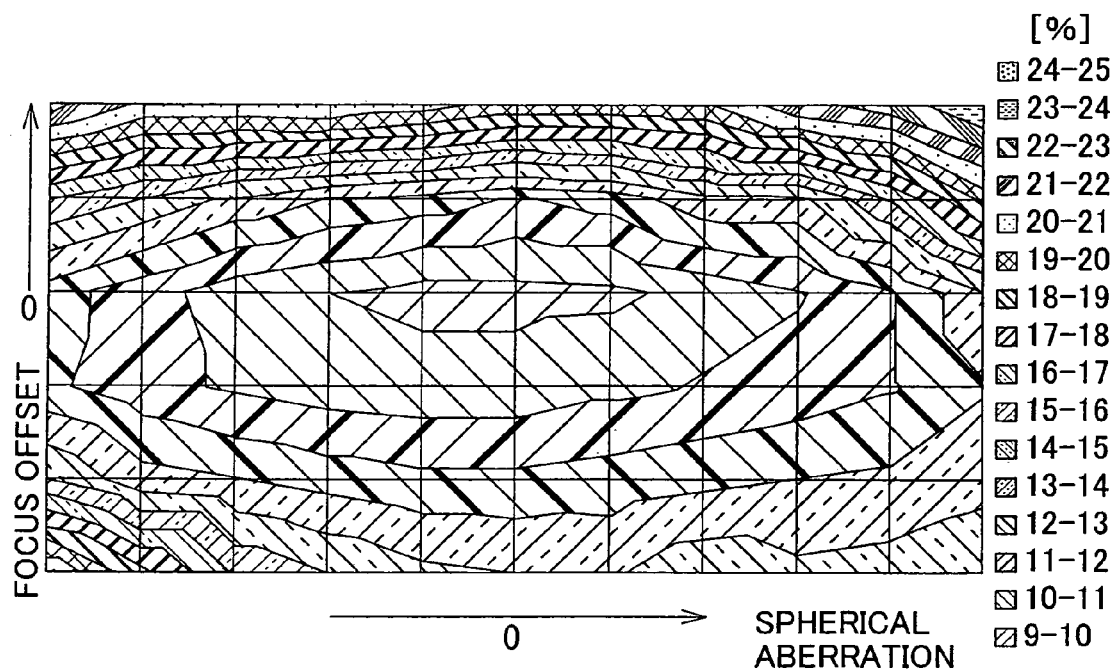
FIGS. 14(a), 14(b), in relation to an optical pickup which is another embodiment of the present invention, are drawings depicting measurements of the relationship between spherical aberration and focus offset found in a reproduced signal which was experimentally written in the absence of spherical aberration and focus offset.
Figure 14:
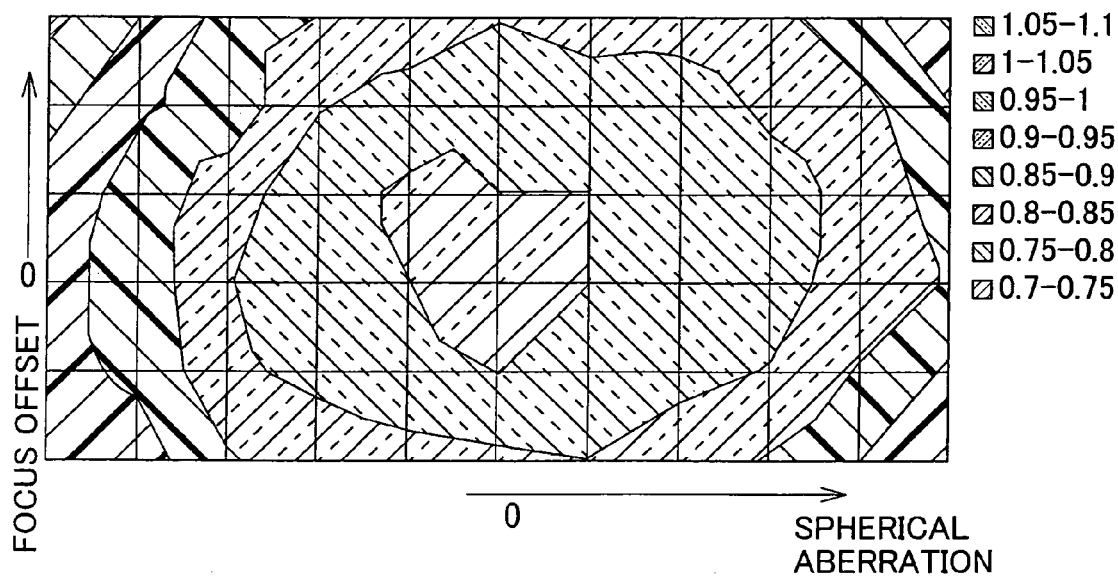
Figure 15:
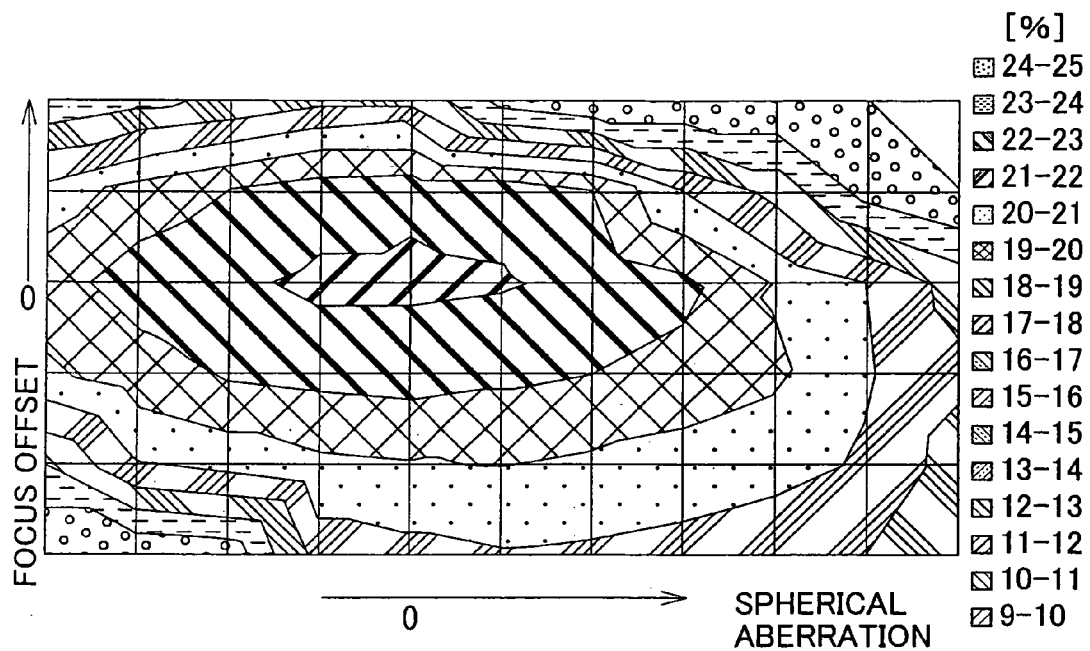
FIGS. 15(a), 15(b), in relation to an optical pickup which is a further embodiment of the present invention, are drawings depicting an example set of measurements of the relationship between spherical aberration and focus offset found in a reproduced signal which was experimentally written in the presence of spherical aberration and focus offset.
Figure 15:
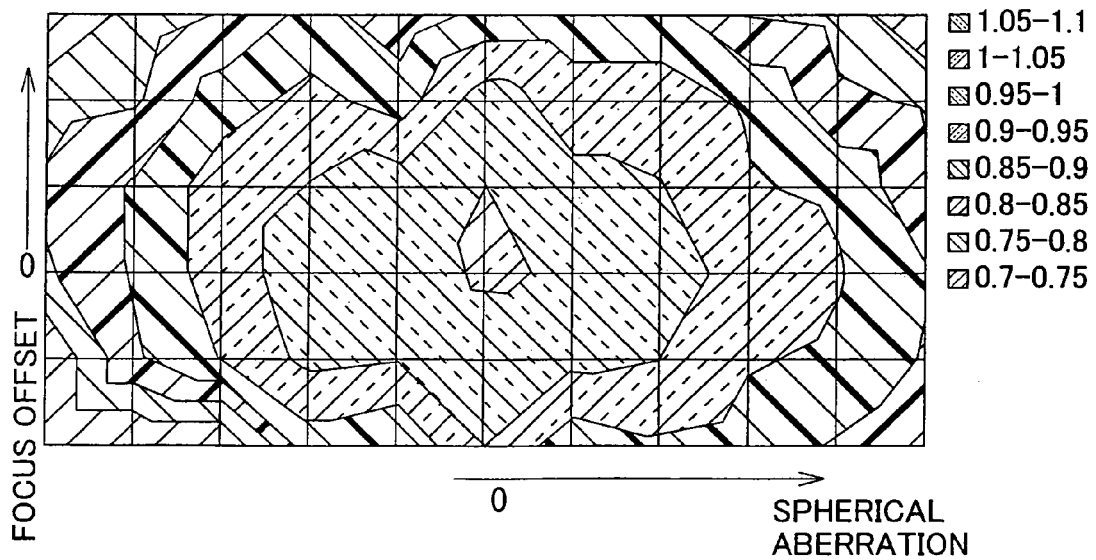
Figure 16:
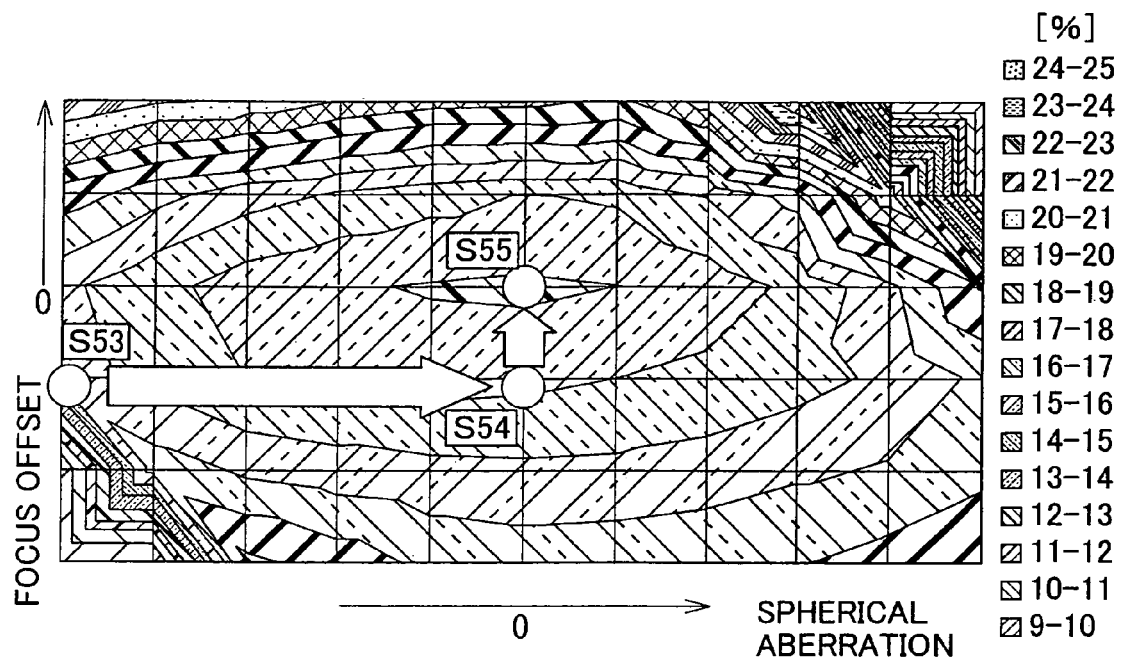
FIGS. 16(a), 16(b), in relation to an optical pickup which is a still further embodiment of the present invention, are drawings depicting another example set of measurements of the relationship between spherical aberration and focus offset found in a reproduced signal which was experimentally written in the presence of spherical aberration and focus offset.
Figure 16:
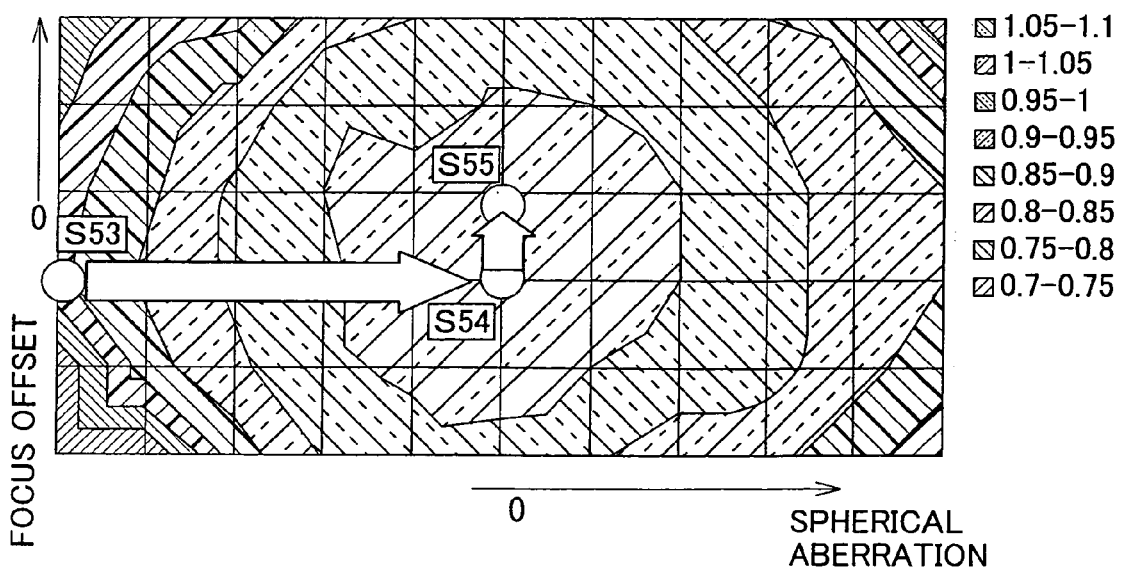

Results of experiments conducted by the inventors are shown in FIGS. 14(a), 14(b) to FIGS. 16(a), 16(b). Figures 14(a), 14(b) show a state where the pickup causes no spherical aberration or focus offset. A RF signal is recorded (test written) at the optimal write power. The horizontal axes indicate the magnitude of spherical aberration of the recorded signal. The vertical axes indicate its focus offset. As reference signals, FIGS. 14(a), 14(b) show measurements of the jitter and maximum amplitude of a RF signal respectively in 2-dimensional maps.

Figure 18:
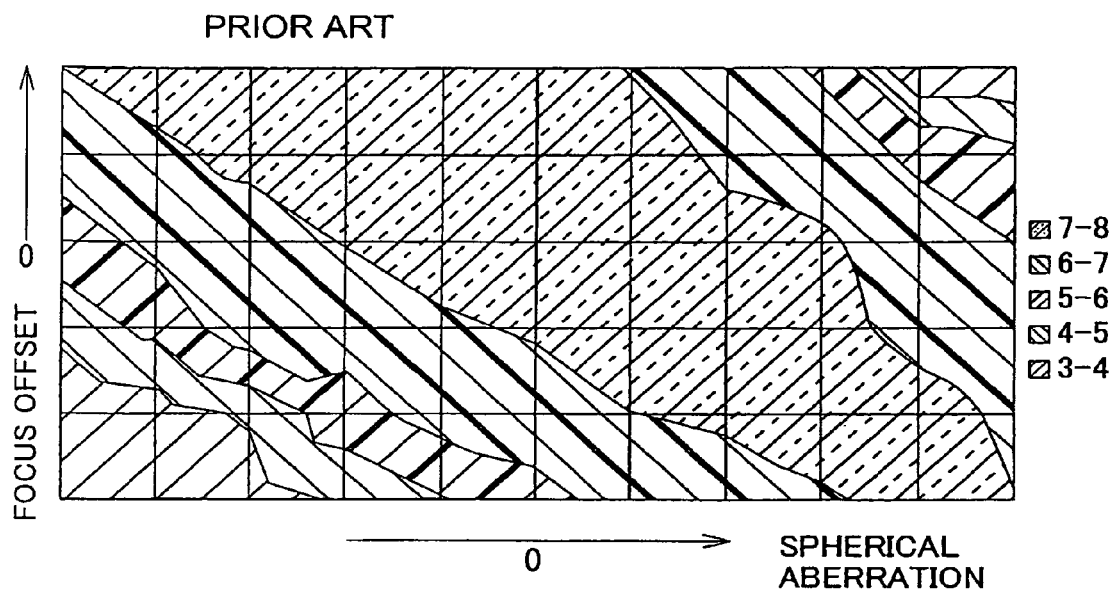
FIG. 18 is a graph plotted from measurement of relationship between spherical aberration and focus offset.

Similarly to FIG. 18, the optical disc 4 here contains a 0.1 mm thick transparent substrate and made of polycarbonate. The disc 4 has a track pitch of 0.32 μm and a disc groove depth of 21 nm. The laser wavelength of a measurement pickup is 405 nm, and the NA of the objective lens 27 is 0.85. In the 2-dimensional maps, 6 points are plotted for the magnitude of spherical aberration ranging from −80 mλ to +80 mλ, and 11 points are plotted for the focus offset ranging from −0.22 to +0.22 μm, which makes a total of 66 data points.

It is understood from FIGS. 14(a), 14(b) that the jitter is smallest at the origin, and the maximum amplitude is greatest at the origin. Both characteristics are represented by concentric circles around the origin. In the presence of spherical aberration and focus offset, a beam does not come in focus on the optical disc 40. As resolution thus deteriorates, the beam spills into adjacent tracks and the preceding and succeeding data records and dose not produce a well-focused image on the light receiving elements A to D. This is the cause of the jitter.

These results make a good contrast to FIGS. 15(a), 15(b) where the pickup 20 causes a spherical aberration equivalent to a total of the CG thickness and +7 μm and a focus offset of 0.1 μm. A RF signal is recorded at the optimal write power. The horizontal axes indicate the magnitude of spherical aberration of the recorded signal. The vertical axes indicate its focus offset. As reference signals, FIGS. 15(a), 15(b) show measurements of the jitter and maximum amplitude of a RF signal respectively in 2-dimensional maps. CG thickness refers to the thickness of the transparent substrate (cover glass) on the recording surface of the disc. "The CG thickness and +7 μm" refers to a total of the designed cover glass thickness and +7 μm. When the design cover glass has a thickness of 0.1 mm, the sum is 0.107 mm.

Similarly to FIGS. 14(a), 14(b), FIG. 15(a) and FIG. 15(b) show the smallest jitter at the origin and the greatest maximum amplitude at the origin. Both characteristics are represented by concentric circles around the origin. Therefore, the jitter and the maximum amplitude can be converged at the origin even when neither the spherical aberration nor the focus offset is optimal. In other words, the optimal values of the spherical aberration and the focus offset can be detected in single correction steps, whichever value the magnitude of spherical aberration assumes in focus offset correction and whichever value the focus offset assumes in spherical aberration correction.

FIGS. 16(a), 16(b) are a case where the pickup causes a spherical aberration equivalent to a total of the CG thickness and +7 μm and a focus offset of 0.1 μm. A RF signal is recorded at a write power 20% greater than the optimal value. The horizontal axes indicate the magnitude of spherical aberration of the recorded signal. The vertical axes indicate its focus offset. As reference signals, FIGS. 16(a), 16(b) show measurements of the jitter and maximum amplitude of a RF signal respectively in 2-dimensional maps.

It is understood from FIGS. 16(a), 16(b) that the relationship between the spherical aberration and the focus offset is not affected by variations in the write power in test writing.

Summing up the discussion, FIGS. 14(a), 14(b) show that when a RF signal recorded under the optimal conditions is used as the reference signal, the jitter is a minimum and the RF signal amplitude is a maximum only when there is zero spherical aberration and zero focus offset. FIGS. 15(a), 15(b) show that when a RF signal recorded at some remaining spherical aberration and focus offset is used as the reference signal, the jitter is a minimum and the RF signal amplitude is a maximum only when there is zero spherical aberration and zero focus offset. FIGS. 16(a), 16(b) show that when a RF signal recorded at some remaining spherical aberration and focus offset and non-optimal write power is used as the reference signal, the jitter is a minimum and the RF signal amplitude is a maximum only when there is zero spherical aberration and zero focus offset.

Therefore, a RF signal which is recorded when the write power is yet to be adjusted can be used as the reference signal in adjusting the spherical aberration and the focus offset. That is, the spherical aberration and the focus offset can be independently adjusted regardless of recording conditions. Now, these results will be utilized in the following to devise procedures of adjusting the spherical aberration and the focus offset.

Figure 17:
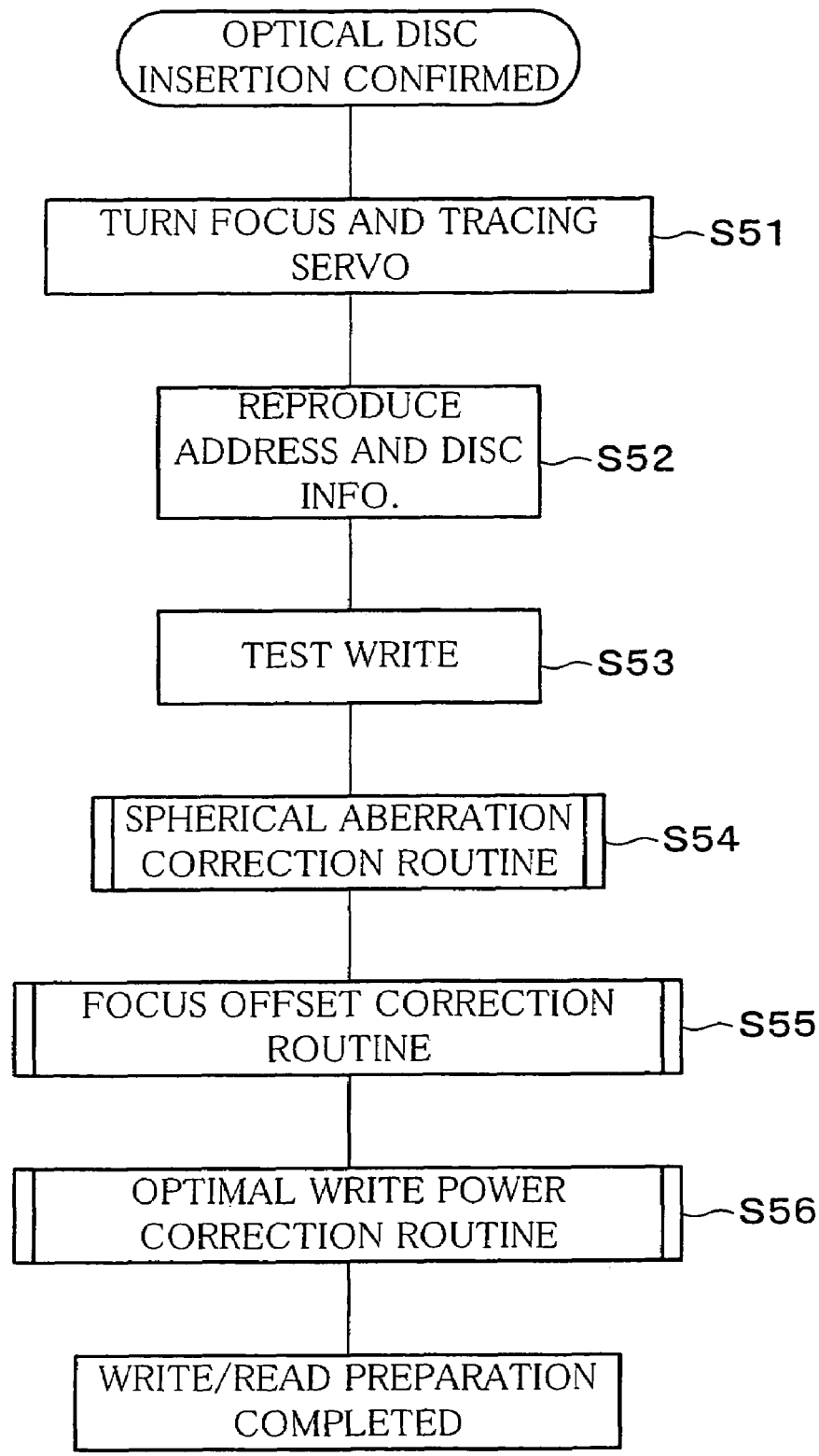
FIG. 17 is a drawing depicting a flow chart depicting an example set of steps correcting spherical aberration and focus offset for an optical pickup which is an even further embodiment of the present invention.

FIG. 17 is a flow chart illustrating procedures of correcting the spherical aberration. The control circuit 50 executes control operation on the pickup 20 in accordance with a main routine (not shown) to implement various read/write actions. If the optical disc 40 is inserted into the read/write device while the control circuit 50 is executing the main routine, the control circuit 50 proceeds to execute a spherical aberration correction subroutine illustrated in FIG. 17 before starting actual read/write actions.

First of all, in step S51, the control circuit 50 moves the pickup 20 close to the center of the disc. The circuit 50 feeds a "logic 1" focus servo switching signal FS to the servo loop switch 5 to turn on the focus servo and a "logic 1" tracking servo switching signal TS to the servo loop switch 6 to turn on the tracking servo.

In step S52, the circuit 50 reproduces address information and moves the pickup to the track where disc information is recorded as indicated by the reproduced address information, so as to retrieve the write power, write pulse occur timings, and other information related to the writing of the disc. The address and disc information is frequency-modulated and recorded in the wobbles of tracks when the disc is manufactured. It is reproduced, similarly to the tracking error signal TE', from a difference signal, (RA+RD)−(RB+RC).

In step S53, the circuit 50 moves the pickup to a test write area to test-write data under the retrieved recording conditions. In next step S54, the circuit 50 proceeds to a spherical aberration correction routine where the distance between the lens 32, 33 in the beam expander 35 is corrected to maximize the signal amplitude of the test-written RF signal. In step S55, the circuit 50 proceeds to a focus offset correction routine where the focus offset is adjusted to maximize the signal amplitude of the test-written RF signal. After step S55, the control circuit 50 proceeds to step S56 to execute a write power correction subroutine where an optimal write power is determined to conclude preparation for data read/write.

Referring to FIGS. 16(a), 16(b), this correction routine is described. If in the test write in step S53, a RF signal is recorded at a focus offset of 0.1 μm, a spherical aberration equivalent to the CG thickness +7 μm, and a write power 20% greater than the optimal value, step S54 corrects only the spherical aberration to 0 and step S55 corrects the focus offset to 0. That is, steps S54 and S55 converge the spherical aberration and the focus offset to the center of the concentric circles in FIGS. 16(a), 16(b).

The spherical-aberration correction routine in step S54 and the focus offset correction routine in step S55 may be interchangeable. Either routine can be implemented first before the other, still capable of the converging to the center of concentric circles in FIG. 16.

An example of specific procedures of the spherical aberration correction routine in step S54 is already given with reference to FIG. 8. RF signal level changes when there is spherical aberration remaining with the optical pickup in FIG. 6 and the lens distance in the beam expander 35 is varied to change the spherical aberration are, as mentioned earlier, shown in FIG. 7. In FIG. 7, the P-V value refers to a maximum minus a minimum of the aberration and either positive or negative as indicated by a plus or a minus sign.

The FIG. 8 operation utilizes the RF signal amplitude in various processing. In place of the RF signal amplitude, the jitter or error rate may be used.

In addition, the position of the spherical aberration correction means where the optimal spherical aberration is produced may be stored in memory means (e.g., the position of the beam expander 35 may be stored in a memory) for later retrieval based on which a next spherical aberration and focus offset correction steps are implemented. This approach has advantages: for instance, the optimal value detection step can be quickly completed when compared with the use of a groundless value as the magnitude of spherical aberration.

Hence, the optical pickup quickly and accurately corrects spherical aberration and focus offset on the writeable optical disc 40. The optical pickup requires writing only once and at a single write power, quickly implementing corrections, whereas Tokukaisho 64-27030 must write a set of sectors at multiple write powers and read all those sectors to obtain an optimal magnitude of correction.

The description so far has assumed the use the amplitude of the RF signal of which the quality must be ensured by the optical pickup as the reference signal in the correcting. The use leads to accurate correction, requires no complex signal processing, and can be implemented on a simple circuit. However, as mentioned earlier, RF signal jitter, error rate, and other alternatives are possible.

If jitter, which is highly related to RF signal quality, is used as the reference signal, the spherical aberration and the focus offset are corrected to produce a minimum jitter. This arrangement improves correction accuracy over amplitude detection and still requires relatively simple signal processing, albeit not as simple as in amplitude detection.

Alternatively, if error rate, which is highly related to RF signal quality, is used as the reference signal, the spherical aberration and the focus offset are corrected to produce a minimum error rate. This arrangement provides the highest level of accuracy and good sensitivity in correction, although it adds to the circuit size and is susceptible to noise. The arrangement is especially effective in fine-tuning the focus offset.

Alternatively, if the RF signal amplitude, the jitter, and the error rate may be used together as the reference signals. For example, the spherical aberration is corrected based on the amplitude of the RF signal, and the focus offset is corrected based on the jitter.

The structure of the optical pickup of the present embodiment is not limited to the one shown in FIG. 6. The pickup may be arranged as in FIG. 1. In place of the beam expander 35, the FIG. 1 optical pickup includes the liquid crystal panel 25 between the quarter-wave plate 24 and the objective lens 26. The focusing tracking actuator 27 moves these objective lens 26 and liquid crystal panel 25 together. This kind of optical pickup was already detailed above.

In the spherical aberration correction utilizing the liquid crystal panel 25, a desired magnitude of spherical aberration, which can cancel the spherical aberration caused by the irregular thickness of the transparent substrate, can be produced immediately with no mechanical motion as described earlier. External disturbances do not affect the pickup. The magnitude of spherical aberration for correction can be accurately managed. However, when compared with the beam expander 35, a high level of accuracy is required in assembly and calibration. Also, a voltage needs be applied to the liquid crystal throughout the aberration correction process, adding to power consumption.

The present embodiment provides an optical pickup, for read/write of a writeable optical disc, which quickly corrects the spherical aberration and focus offset caused by an irregularity thickness of the cover of the optical disc.

To achieve this end, the present embodiment is arranged as follows. FIGS. 16(a), 16(b) show measurements the RF signal jitter and maximum amplitude of a test-written RF signal in 2-dimensional maps respectively. The RF signal is test-written in the presence of spherical aberration and focus offset and at a non-optimal write power. The horizontal axes indicate the magnitude of spherical aberration. The vertical axes indicate the focus offset. The jitter is smallest at the origin, and the maximum amplitude value is greatest at the origin. Both characteristics are represented by concentric circles around the origin. The optimal value of either one of the characteristics is detectable without being affected, when the other one is not optimal. Therefore, the spherical aberration correction and the offset adjustment can be independently carried out in respective single test writings.

As discussed in the foregoing, a method of correcting a spherical aberration focus offset of an optical pickup of the present invention involves: the step of recording a signal on a storage medium at a predetermined write power; the step of reproducing recorded information from reflection from a recording surface of the storage medium; the step of producing a spherical aberration in the presence of a predetermined focus offset and changing the magnitude of the spherical aberration; the optimal spherical aberration detection step of detecting a spherical aberration occurrence condition when the spherical aberration is a minimum; the step of producing a focus offset under the minimum spherical aberration occurrence condition and changing the magnitude of the focus offset; and the optimal focus offset detection step of detecting a focus offset occurrence condition when the focus offset is a minimum, wherein the magnitude of the spherical aberration and the magnitude of the focus offset obtained in the optimal spherical aberration detection step and the optimal focus offset detection step are used to correct the spherical aberration and the focus offset.

Another method of correcting a spherical aberration focus offset of an optical pickup of the present invention involves: the step of recording a signal on a storage medium at a predetermined write power; the step of reproducing recorded information from reflection from a recording surface of the storage medium; the step of producing a focus offset in the presence of a predetermined spherical aberration and changing the magnitude of the focus offset; the optimal focus offset detection step of detecting a focus offset occurrence condition when the focus offset is a minimum; the step of producing a spherical aberration under the minimum focus offset occurrence condition and changing the magnitude of the spherical aberration; and the optimal spherical aberration detection step of detecting a spherical aberration occurrence condition when the spherical aberration is a minimum, wherein the magnitude of the spherical aberration and the magnitude of the focus offset obtained in the optimal focus offset detection step and the optimal spherical aberration detection step are used to correct the spherical aberration and the focus offset.

In the present embodiment, the control circuit 50 acts as the recording condition detecting means, the test write means, and the correcting means; the RF signal generator circuit 3 acts as the correcting means; the laser producing element 21 acts as the test write means; the beam expander 25 acts as the correcting means; the beam expander actuator 34 acts as the correcting means; the liquid crystal panel 25 acts as the correcting means; and the liquid crystal driver 4 acts as the correcting means and the liquid crystal drive circuit.

As in the foregoing, an optical pickup of the present invention includes correcting means producing a spherical aberration which cancels a spherical aberration in an optical system for correction when the pickup projects a collected beam onto a recording surface of an optical storage medium to retrieve recorded information by means of the intensity of reflection from the recording surface. The pickup is arranged so that the correcting means is capable of producing at least two spherical aberrations of different magnitudes by means of a collected beam spot on the recording surface of the optical storage medium so that the magnitudes are ¼ or more of the wavelength λ in P-V values or ¹⁄₁₄ or more of the wavelength λ in standard deviation. The pickup is arranged also so that the pickup includes control means which: causes the correcting means to produce the two second spherical aberrations of different magnitudes; calculates an optimal magnitude of aberration correction through a numeric evaluation based on an evaluation value of a reference signal obtained by receiving the reflection of intensities in the presence of the spherical aberrations of such magnitudes; and controls the correcting means to carry out correction using the optimal magnitude of aberration correction.

INDUSTRIAL APPLICABILITY

According to an optical pickup and spherical aberration correction method for optical pickups of the present invention, the correcting means produces spherical aberrations of which the magnitudes are ¼ or more of the wavelength λ in P-V values or ¹⁄₁₄ or more of the wavelength λ in standard deviation. A part where the changes in the evaluation value of the reference signal show high sensitivity to changes in magnitude of the spherical aberration can be utilized as a reference signal obtainable corresponding to these magnitudes of the spherical aberrations.

Therefore, the optimal magnitude of aberration correction calculated through a numeric evaluation based on the evaluation value of the reference signal obtainable corresponding to the magnitudes of the spherical aberrations is not affected by noise, external disturbance, and other unwanted factors, allows for the determination of a single value, and enables quick and more accurate spherical aberration correction with an optimal magnitude of aberration correction.

In the method of correcting a spherical aberration focus offset of an optical pickup and the optical pickup of the present invention, in correcting the spherical aberration and the focus offset of the optical pickup, the inventors varied two parameters, the spherical aberration and the focus offset, independently and paid attention to a finding that the optimal value of either one of the parameters could be obtained without being affected, when the other parameter was not optimal. Accordingly, in read operation, the spherical aberration is first varied to detect an optimal magnitude of spherical aberration. Subsequently, using that optimal magnitude of spherical aberration, the focus offset is varied to detect an optimal magnitude of focus offset. Alternatively, the focus offset is first varied to detect an optimal magnitude of focus offset. Subsequently, using that optimal magnitude of spherical aberration, the spherical aberration is varied to detect an optimal magnitude of spherical aberration.

Thus, the spherical aberration and focus offset of a writeable optical disc can be corrected quickly and accurately.

The invention claimed is:

1. An optical pickup projecting a collected beam onto a recording surface of an optical storage medium to retrieve recorded information by means of an intensity of reflection from the recording surface, said pickup correcting a first spherical aberration in an optical system by producing at correcting means a second spherical aberration which cancels the first spherical aberration, said pickup being characterized in that:

the correcting means is capable of producing at least two second spherical aberrations of different magnitudes by means of a collected beam spot on the recording surface of the optical storage medium so that the magnitudes are ¼ or more of a wavelength λ in differences between maximum of measurement values and minimum of the measurement values or ¹/₁₄ or more of a wavelength λ in standard deviation; and said pickup comprises control means which: causes the correcting means to produce the at least two second spherical aberrations of different magnitudes; calculates an optimal magnitude of aberration correction for the first spherical aberration through a numeric evaluation based on an evaluation value of a reference signal obtained by receiving reflection of intensities in the presence of the spherical aberrations of such magnitudes; and controls the correcting means to carry out correction using the optimal magnitude of aberration correction.

2. The optical pickup as set forth in claim 1, wherein in the numeric evaluation, the control means calculates an approximation curve from the at least two second spherical aberrations of different magnitudes produced by the correcting means and the evaluation value for these second spherical aberrations and designates a peak or bottom position of the approximation curve as the optimal magnitude of aberration correction.

3. The optical pickup as set forth in claim 2, wherein the approximation curve is a multiple term approximation curve.

4. The optical pickup as set forth in claim 1, wherein the control means:

causes the correcting means to produce the two second spherical aberrations of different magnitudes so that the two second spherical aberrations are separated by ½ or more of a wavelength λ in differences between maximum of measurement values and minimum of the measurement values and that the second spherical aberrations have substantially equal evaluation values;

calculates a mean value of the two magnitudes of the spherical aberrations as the numeric evaluation; and uses the mean value obtained in the mean value calculation as the optimal magnitude of aberration correction.

5. The optical pickup as set forth in claim 1, wherein the control means:

causes the correcting means to produce a second spherical aberration of a first magnitude and a second spherical aberration of a second magnitude which is separated by ½ or more of a wavelength λ in differences between maximum measurement values and minimum of the measurement values from the second spherical aberration of the first magnitude so that the second spherical aberration of the second magnitude can produce a reference signal having an evaluation value substantially equal to that of a reference signal obtained in the production of the second spherical aberration of the first magnitude;

calculates a mean value of the second spherical aberrations of the first and second magnitudes as the numeric evaluation; and uses the mean value obtained in the mean value calculation as the optimal magnitude of aberration correction.

6. The optical pickup as set forth in claim 1, wherein the correcting means includes:

a liquid crystal panel containing a circular band of transparent electrode provided on a liquid crystal layer filled with birefringent liquid crystal; and a liquid crystal drive circuit applying to the transparent electrode voltages corresponding to the at least two second spherical aberrations of different magnitudes.

7. The optical pickup as set forth in claim 1, wherein the correcting means is a beam expander including a pair of lenses and capable of producing the second spherical aberrations by varying a distance between the lenses.

8. The optical pickup as set forth in claim 1, wherein the correcting means is positioned on an optical path along which the beam projected onto the recording surface of the optical storage medium and the reflection from the recording surface travel.

9. The optical pickup as set forth in claim 1, wherein:

the control means:

causes the correcting means to produce a second spherical aberration of a first magnitude and a second spherical aberration of a second magnitude so that the second spherical aberration of the second magnitude can produce a reference signal having an evaluation value substantially equal to that of a reference signal obtained in the production of the second spherical aberration of the first magnitude;

calculates a mean value of the second spherical aberrations of the first and second magnitudes as the numeric evaluation; and uses the mean value obtained in the mean value calculation as the optimal magnitude of aberration correction; and the first and second magnitudes are smaller than a maximum signal amplitude by 5% or more.

10. The optical pickup as set forth in claim 1, wherein:

prior to adjustment of a focus offset, the control means:

causes the correcting means to produce a second spherical aberration of a first magnitude and a second spherical aberration of a second magnitude so that the second spherical aberration of the second magnitude can produce a reference signal having an evaluation value substantially equal to that of a reference signal obtained in the production of the second spherical aberration of the first magnitude;

calculates a mean value of the second spherical aberrations of the first and second magnitudes as the numeric evaluation; and uses the mean value obtained in the mean value calculation as the optimal magnitude of aberration correction; and the first and second magnitudes are smaller than a maximum signal amplitude by 10% or more.

11. The optical pickup as set forth in claim 1, wherein the reference signal is an information signal read from the recording surface of the optical storage medium, and an evaluation value of the reference signal is an amplitude level.

12. The optical pickup as set forth in claim 1, wherein the reference signal is a tracking error signal, and an evaluation value of the reference signal is an amplitude level.

13. The optical pickup as set forth in claim 1, wherein the reference signal is an information signal, and an evaluation value of the reference signal is jitter.

14. The optical pickup as set forth in claim 1, wherein the reference signal is an information signal, and an evaluation value of the reference signal is an error rate.

15. A method of correcting a spherical aberration of an optical pickup,
   said method correcting a first spherical aberration in an optical system by producing a second spherical aberration which cancels the first spherical aberration when the pickup projects a collected beam onto a recording surface of an optical storage medium to retrieve recorded information by means of an intensity of reflection from the recording surface,
   said method being characterized in that it comprises the steps of:
   producing at least two second spherical aberrations of different magnitudes by means of a collected beam spot on the recording surface of the optical storage medium so that the magnitudes are $1/4$ or more of a wavelength $\lambda$ in differences between maximum of measurement values and minimum of the measurement values or $1/14$ or more of a wavelength $\lambda$ in standard deviation;
   calculating an optimal magnitude of aberration correction for the first spherical aberration through a numeric evaluation based on an evaluation value of a reference signal obtained by receiving reflection of intensities in the presence of the spherical aberrations of such magnitudes; and
   correcting the first spherical aberration using the optimal magnitude of aberration correction.

* * * * *